US011544694B2

(12) United States Patent
D'Agostino et al.

(10) Patent No.: US 11,544,694 B2
(45) Date of Patent: Jan. 3, 2023

(54) REAL-TIME AUTHORIZATION OF INITIATED DATA EXCHANGES BASED ON TOKENIZED DATA HAVING LIMITED TEMPORAL OR GEOGRAPHIC VALIDITY

(71) Applicant: The Toronto-Dominion Bank, Toronto (CA)

(72) Inventors: Dino D'Agostino, Richmond Hill (CA); Perry Aaron Jones Haldenby, Toronto (CA); Dean C. N. Tseretopoulos, Toronto (CA); Jeffrey Aaron Ecker, North York (CA); Adam Douglas McPhee, Waterloo (CA); Milos Dunjic, Oakville (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 37 days.

(21) Appl. No.: 17/147,535

(22) Filed: Jan. 13, 2021

(65) Prior Publication Data
US 2021/0133723 A1 May 6, 2021

Related U.S. Application Data

(63) Continuation of application No. 15/892,844, filed on Feb. 9, 2018, now Pat. No. 10,922,673.

(51) Int. Cl.
*G06Q 20/32* (2012.01)
*H04W 12/64* (2021.01)
(Continued)

(52) U.S. Cl.
CPC ..... *G06Q 20/3224* (2013.01); *G06Q 20/3821* (2013.01); *G06Q 20/40* (2013.01); *H04W 12/64* (2021.01); *H04W 4/023* (2013.01)

(58) Field of Classification Search
USPC ..................................... 705/35, 44
See application file for complete search history.

(56) References Cited

U.S. PATENT DOCUMENTS 6,052,675 A * 4/2000 Checchio ............. G06Q 20/102
705/40
7,765,162 B2 7/2010 Binder et al.
(Continued)

OTHER PUBLICATIONS

"Pre Authorized Cash Withdrawal," IP.com Prior Art Database Technical Disclosure, Dec. 11, 2019 (1 page).

*Primary Examiner* — William E Rankins
(74) *Attorney, Agent, or Firm* — Duane Morris LLP

(57) ABSTRACT

The disclosed exemplary embodiments include computer-implemented systems, apparatuses, and processes that, among other things, authorize initiated exchanges of data based on tokenized data characterized by a limited temporal or geographic validity. For example, an apparatus may receive a first signal that includes first information identifying a first geographic position of a client device. The apparatus may also obtain a digital token representative of a pre-authorization of a data exchange between the client device and a terminal device during a corresponding temporal interval. The terminal device may, for example, be disposed within a geographic region that includes the first geographic position of the client device. The apparatus may generate and transmit a second signal that includes the digital token to the client device. In some examples, the apparatus may transmit the second signal being through a programmatic interface associated with an application program executed by the client device.

20 Claims, 9 Drawing Sheets

(51) Int. Cl.
  *G06Q 20/38* (2012.01)
  *G06Q 20/40* (2012.01)
  *H04W 4/02* (2018.01)

(56) References Cited

U.S. PATENT DOCUMENTS

| | | | |
|---|---|---|---|
| 8,438,066 B1 | 5/2013 | Yuen et al. | |
| 8,751,391 B2 | 6/2014 | Fruend | |
| 9,129,273 B2 | 9/2015 | Baldwin et al. | |
| 9,947,010 B2* | 4/2018 | Wong | G06Q 20/401 |
| 2003/0046235 A1* | 3/2003 | Lacivita | G06Q 20/382 |
| | | | 705/44 |
| 2009/0177563 A1 | 7/2009 | Bernstein | |
| 2010/0125510 A1 | 5/2010 | Smith et al. | |
| 2012/0295580 A1* | 11/2012 | Corner | G06Q 20/385 |
| | | | 455/410 |
| 2014/0012701 A1 | 1/2014 | Wall et al. | |
| 2014/0129441 A1* | 5/2014 | Blanco | G06Q 20/401 |
| | | | 705/44 |
| 2014/0379576 A1* | 12/2014 | Marx | G06Q 20/405 |
| | | | 705/44 |
| 2015/0213443 A1* | 7/2015 | Geffon | G06Q 20/3821 |
| | | | 705/76 |
| 2015/0379514 A1* | 12/2015 | Poole | G06Q 20/325 |
| | | | 705/44 |
| 2016/0210623 A1 | 7/2016 | Voege | |
| 2016/0267516 A1 | 9/2016 | Walz et al. | |
| 2017/0091764 A1 | 3/2017 | Lloyd et al. | |
| 2018/0047016 A1* | 2/2018 | Sarin | G06Q 20/3674 |
| 2018/0114212 A1* | 4/2018 | Beck | G06Q 20/4016 |
| 2019/0122200 A1* | 4/2019 | Kurian | G06Q 20/102 |
| 2019/0139023 A1* | 5/2019 | Vyas | G06Q 20/3821 |

\* cited by examiner

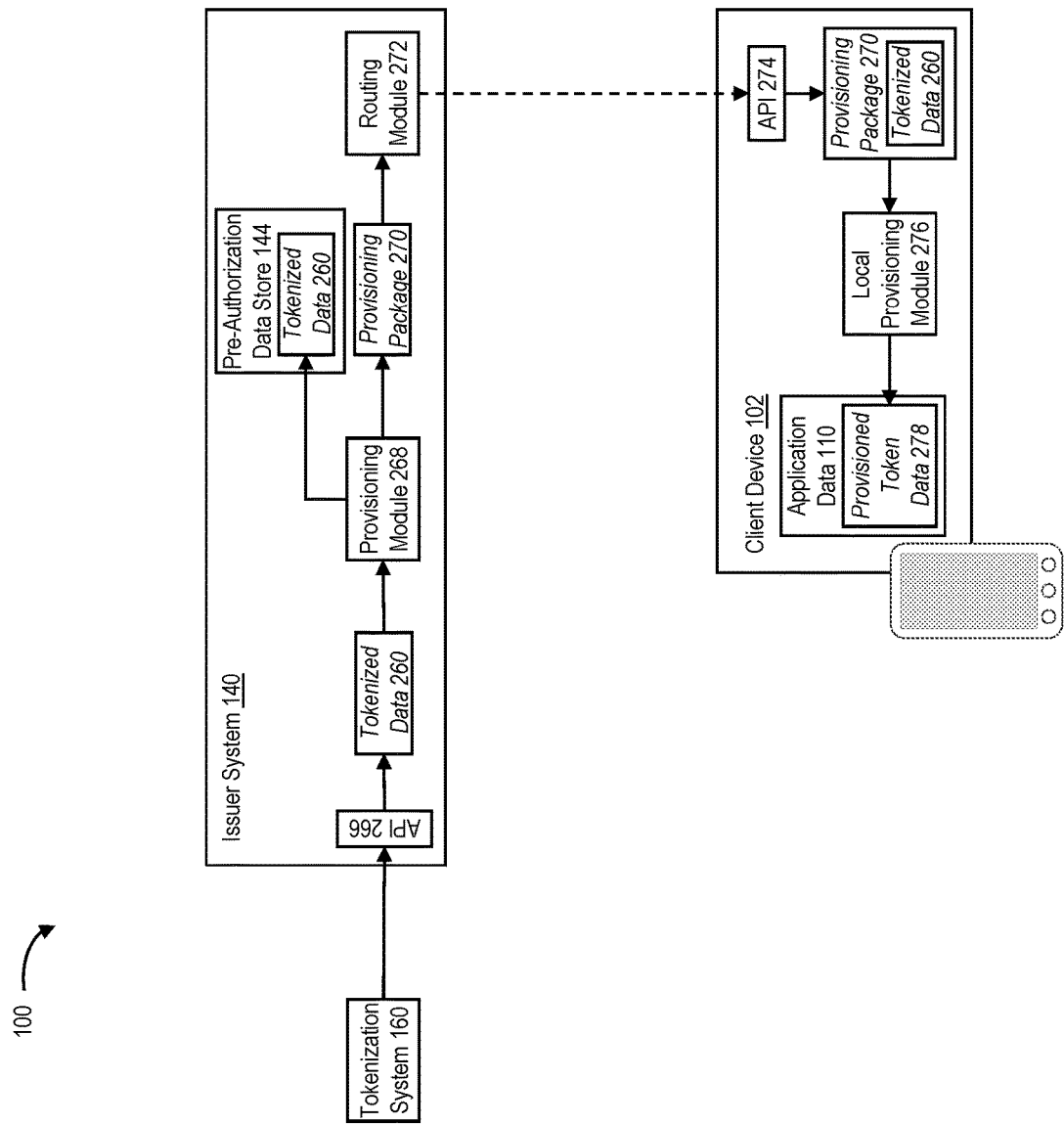

REAL-TIME AUTHORIZATION OF INITIATED DATA EXCHANGES BASED ON TOKENIZED DATA HAVING LIMITED TEMPORAL OR GEOGRAPHIC VALIDITY

CROSS-REFERENCE TO RELATED APPLICATION

This application is a continuation of, and claims the benefit of priority to, U.S. application Ser. No. 15/892,844, filed Feb. 9, 2018, the disclosure of which is incorporated by reference herein to its entirety.

TECHNICAL FIELD

The disclosed embodiments generally relate to computer-implemented systems and processes that authorize initiated exchanges of data based on tokenized data characterized by a limited temporal or geographic validity.

BACKGROUND

Today, payment systems and related technologies continuously evolve in response to advances in payment instruments, such as the ongoing transition from physical transaction cards to digital payment instruments maintained on mobile devices. While these innovations result in additional mechanisms for submitting payment to an electronic or physical merchant, and for flexibly funding transactions initiated by the electronic or physical merchant, these innovations can also be susceptible to fraudulent activity.

SUMMARY

In some examples, an apparatus may include a communications unit, a storage unit storing instructions, and at least one processor coupled to the communications unit and the storage unit. The at least one processor may be configured to execute the instructions to receive a first signal via the communications unit. The first signal may include first information identifying a first geographic position of a client device, and the at least one processor may be further configured to obtain a digital token representative of a pre-authorization of a data exchange between the client device and a terminal device during a corresponding temporal interval. The terminal device may be disposed within a geographic region that includes the first geographic position of the client device. The at least one processor may be further configured to generate and transmit a second signal to the client device via the communications unit. The second signal may include the digital token, and may be transmitted through a programmatic interface associated with an application program executed by the client device.

In other examples, an apparatus may include a communications unit, a storage unit storing instructions, and at least one processor coupled to the communications unit and the storage unit. The at least one processor may be configured to execute the instructions to: receive a first signal via the communications unit. The first signal may include one or more first parameter values that characterize an exchange of data initiated between a client device and a terminal device, and a digital token representative of a pre-authorization of the data exchange using an available data type. The at least one processor may be further configured to obtain second information associated with the digital token. The second information may include one or more second parameter values that characterize the pre-authorized data exchange and restriction data characterizing a temporal or geographic validity of the digital token, and the at least one processor may be further configured to determine that the one or more first parameter values are consistent with: (i) corresponding ones of the second parameter values; and (ii) corresponding portions of the restriction data. In response to the determined consistency, the at least one processor may be configured to perform operations that authorize an execution of the initiated data exchange in accordance with the first parameter values and using the available data type.

Additionally, in some examples, an apparatus may include a communications unit, a storage unit storing instructions, and at least one processor coupled to the communications unit and the storage unit. The at least one processor may be configured to execute the instructions to obtain a digital token representative of a pre-authorized data exchange between a client device and a terminal device. The client device may be disposed proximate to the terminal device, and the digital token may be associated with a data type available for use in the pre-authorized data exchange. The at least one processor may be further configured to generate and transmit a first signal, which includes the digital token to the client device via the communications unit, and to receive a second signal via the communications unit. In some examples, the second signal may include the digital token and one or more first parameter values that characterize an exchange of data initiated by the client device. The at least one processor may be further configured to determine that the one or more first parameter values are consistent with: (i) corresponding ones of second parameter values that characterize of the pre-authorized data exchange; and (ii) corresponding portions of restriction data that characterize a temporal or geographic validity of the digital token. In response to the determined consistency, the at least one processor may be further configured to perform operations that authorize an execution of the initiated data exchange in accordance with the first parameter values and using the available data type.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 2A-2C are diagrams illustrating portions of an exemplary computing environment, consistent with the disclosed embodiments.

DETAILED DESCRIPTION

Figure 1:
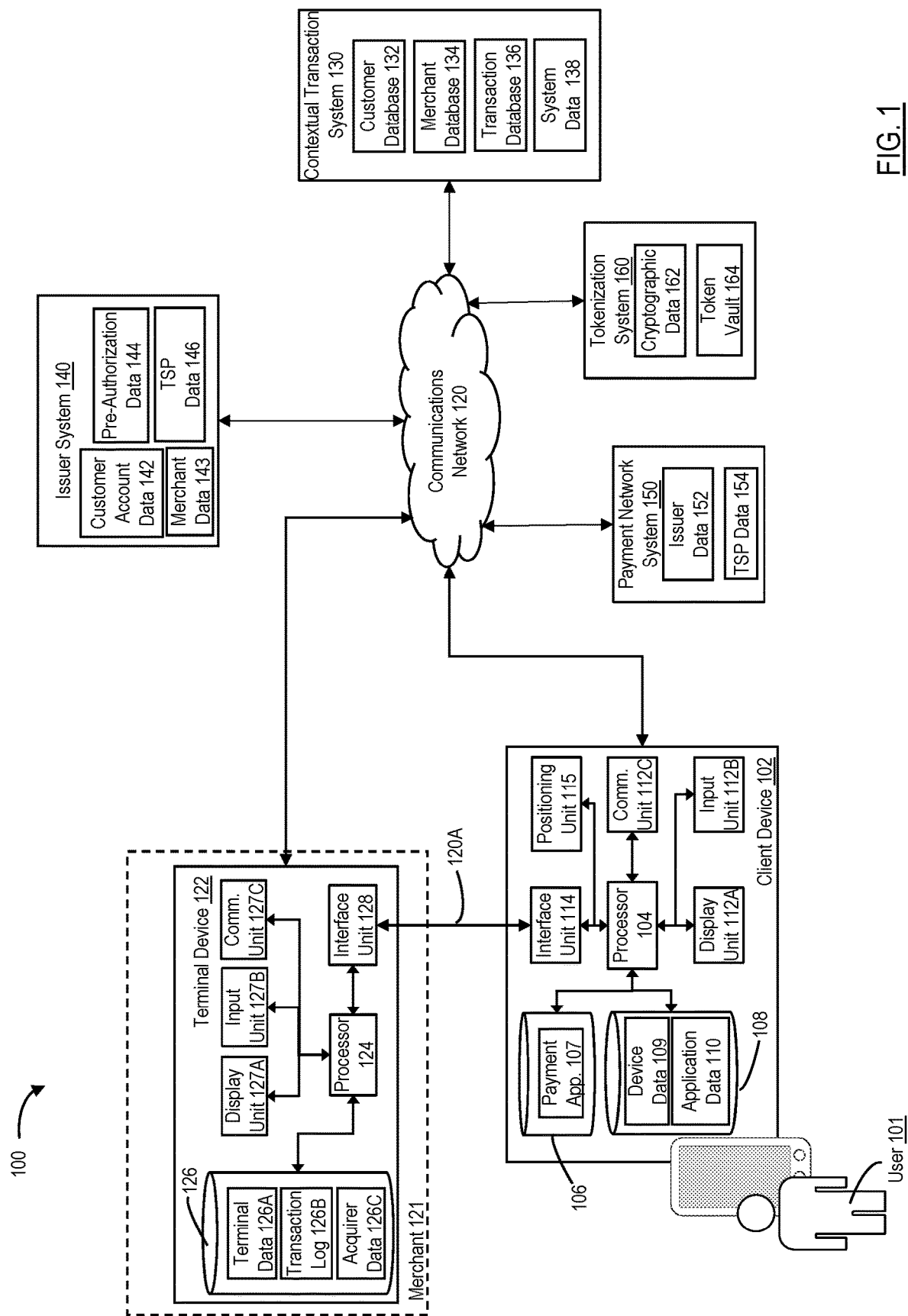
FIG. 1 is a diagram of an exemplary computing environment, consistent with the disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include a client device 102, a terminal device 122, a contextual transaction system 130, an issuer system 140, a payment network system 150, and a tokenization system 160, each of which may be interconnected through any appropriate combination of communications networks, such as network 120.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the network-connected devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

Further, as illustrated in FIG. 1, client device 102 and terminal device 122 may also exchange data across a direct channel of communications, e.g., direct communication channel 120A. In one aspect, direct communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between terminal device 122 and client device 102.

Terminal device 122 may, in some instances, be associated with a merchant, e.g., merchant 121, and client device 102 may be associated with or operated by a customer of merchant 121, e.g., user 101. For example, terminal device 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with terminal device 122 across communications channel 120A, provides data to terminal device 122 specifying a payment instrument available for use in an initiated transaction for the goods and/or services.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, e.g., within application repository 106. For example, as illustrated in FIG. 1, client device 102 may maintain, within application repository 106, an executable application associated with or provisioned by a financial institution that operates issuer system 140, e.g., payment application 107 that establishes and maintains a digital wallet within the one or more tangible, non-transitory memories. The disclosed embodiments are, however, not limited to these exemplary application programs, and in other examples, executable application data 106 may include any additional or alternate application program, application module, or other code elements executable by processor 104, such as a mobile banking application associated with or provisioned by the financial institution, a merchant application associated with merchant 121, or a web browser that facilitates access to digital portals maintained by network-connected systems operating within environment 100.

Client device 102 may also establish and maintain, within the one or more tangible, non-tangible memories, one or more structured or unstructured data repositories or databases, e.g., data repository 108, that include device data 109 and application data 111. In one instance, device data 109 may include data that uniquely identifies client device 102 within environment 100, such as a media access control (MAC) address of client device 102 or an IP address assigned to client device 102. Further, in additional instances, application data 110 may include information that a performance of operations by the one or more executable application programs maintained within application repository 106, e.g., payment application 107.

For example, application data 110 may include one or more unique identifiers of payment application 107 (e.g., a wallet address assigned to the digital wallet established and maintained by executed payment application 107) and data identifying one or more payment instruments available to payment application 107 (e.g., tokenized data or cryptograms representative of payment instruments provisioned to the established digital wallet). Further, in some examples, application data 110 may include additional information that supports an operations of executed payment application 107, such as a digital wallet cryptogram provided to terminal device 122 to validate the established digital wallet, etc.).

Referring back to FIG. 1, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input unit 112B may include, but input not limited to, a keypad, keyboard, touchscreen, voice activated control technologies, or appropriate type of input device. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120 using any of the communications protocols described herein.

Further, in some aspects, client device 102 may include an interface unit 114, which can be configured by processor 104 to establish and maintain communications with terminal device 122 (e.g., through interface unit 128 of FIG. 1) across communications channel 120A. For example, each of interface unit 114 and interface unit 128 may include a communications device, e.g., a wireless transceiver device, capable of exchanging data across communications channel 120A using any of the short-range communications protocols described above (e.g., NFC protocols, RF communications protocols, Bluetooth™ communication protocols, optical communications protocols, etc.). In other examples, interface unit 114 may include one or more electrical connectors capable of engaging with corresponding electrical connectors of interface unit 128 of terminal device 122, or an electrical connector capable receiving a wired connection with terminal device 122 (e.g., a USB connector, etc.).

Additionally, in some aspects, client device 102 may include a positioning unit 115, such as, but not limited to, a Global Positioning System (GPS) unit, an assisted GPS (aGPS) unit, or a sensor consistent with other positioning systems. Positioning unit 115 may be configured by processor 104 to determine a geographic location of client device 102 (e.g., a latitude, longitude, altitude, etc.) at regular temporal intervals, and to store data indicative of the determined geographic location within a portion of corresponding tangible, non-transitory memory (e.g., within a portion of device data 109), along with data identifying the temporal interval (e.g., a time and/or date).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Terminal device 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause terminal device 122 to perform operations consistent with the disclosed embodiments, as described below.

Further, in certain aspects, terminal device 122 may also store and maintain a data repository, e.g., data repository 126, within the one or more tangible, non-transitory memories.

For example, data repository 126 may include terminal data 126A that uniquely identifies terminal device 122 within network 120 (e.g., a MAC address, an IP address, etc.). In additional or alternate examples, terminal data 126A may also include information that specifies a geographic location of terminal device 122 (e.g., a street address of merchant 121, or a corresponding latitude, longitude, and/or latitude of terminal device 122 or merchant 121). Further, in some examples, data repository 126 may include a transaction log 126B that identifies transactions initiated at terminal device 122 and authorized using any of the exemplary processes described herein, acquirer data 126C that uniquely identifies a computer system of an entity, e.g., an acquirer, that administers terminal device 122 and other POS terminals operating in environment 100 (e.g., a MAC address, an IP address, etc., of an acquirer system).

As described above, terminal device 122 may correspond to a point-of-sale (POS) terminal within a physical location of the merchant, such as a location where a customer, such as user 101, may provide payment for goods and/or services (e.g., at a cash register at the merchant). Terminal device 122 may, in some instances, include a display unit 127A configured to present interface elements to user 101, and an input unit 127B configured to receive input from user 101, e.g., in response to the interface elements presented through display unit 127A. By way of example, display unit 127A may include, but is not limited to, an LCD display unit or other appropriate type of display unit, and input unit 127B may include, but input not limited to, a keypad, keyboard, touchscreen, voice activated control technologies, or appropriate type of input device. Further, in additional aspects (not depicted in FIG. 1), the functionalities of display unit 127A and input unit 127B may be combined into a single device, e.g., a pressure-sensitive touchscreen display unit that presents interface elements and receives input from user 101.

Terminal device 122 may also include a communications unit 127C, such as a wireless transceiver device, coupled to processor 124 and configured by processor 124 to establish and maintain communications with network 120 using any of the communications protocols described herein. Further, terminal device 122 may include an interface unit 128, which may be configured by processor 124 to establish and maintain communications with client device 102 (e.g., through interface unit 114 of FIG. 1) across communications channel 120A. In some aspects, interface unit 128 may include a communications device, such as a wireless transceiver device, capable of exchanging data with client device 102 using any of the short-range communications protocols described above (e.g., NFC protocols, RF communications protocols, Bluetooth™ communication protocols, optical communications protocols, etc.).

Examples of terminal device 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, terminal device 122 may also be coupled to a computing system associated with and maintained by merchant 121 (e.g., a cash register, etc.), which may include one more processors and one of more tangible, non-transitory memories storing one or more software applications, application modules, and other elements of code that, when executed by the one or more processors, cause the merchant computing system to exchange data with terminal device 122 and perform operations consistent with the disclosed embodiments.

The disclosed embodiments are not limited to such POS terminals, and in additional aspects, terminal device 122 may correspond to one or more application program modules executed by a computer system maintained by merchant 121, one or more computing systems operating within environment 100, one or more client devices operating within environment 100, such as client device 102. In other embodiments, terminal device 122 may represent a device communicatively coupled to client device 102 to provide mobile point-of-sale and payment services, such as a Square™ device in communication with client device 102.

Referring back to FIG. 1, contextual transaction system 130, issuer system 140, payment network system 150, and tokenization system 160 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary transaction preauthorization processes described herein.

In other instances, and consistent with the disclosed embodiments, one or more of contextual transaction system 130, issuer system 140, payment network system 150, and tokenization system 160 may correspond to a distributed system that includes computing components distributed across one or more networks, such as network 120, or other networks, such as those provided or maintained by cloud-service providers. Additionally, in some instances, subsets of contextual transaction system 130, issuer system 140, payment network system 150, and tokenization system 160 can be incorporated into a single computing system, or incorporated into multiple computing systems.

By way of example, contextual transaction system 130 and issuer system 140 may both be associated with, or operated by, the financial institution that provisioned payment application 107 to client device 102, and a single network-connected computing system may be configured to perform operations consistent with the respective functionalities of contextual transaction system 130 and issuer system 140, as described herein. For instance, a secure, processor-based server of issuer system 140 may be configured to perform operations consistent with the functionalities of contextual transaction system 130, and additionally, or alternatively, the functionalities of contextual transaction system 130 may be implemented by one or more application modules or code elements executed by issuer system 140.

Referring back to FIG. 1, contextual transaction system 130 may be associated with, or may perform operations in support of, one or more native application programs executed by network-connected client devices operating within environment 100, such as, but not limited to, payment application 107 executed by client device 102. To facilitate a performance of certain of the exemplary processes described herein, contextual transaction system 130 may maintain, within one or more tangible non-transitory memories, a customer database 132, a merchant database 134, transaction database 136, and system data 138. In some instances, customer database 132 may include data records that identify and characterize users of the one or more native application programs associated with, or supported by, contextual transaction system 130, such as payment application 107 executed by client device 102. For example, for user 101, the data records of customer database 132 may include, but are not limited to, a unique identifier assigned to user 101 by contextual transaction system 130 (e.g., a login credential associated with payment application 107), a unique device identifier of one or more client devices associated with user 101 (e.g., an IP address or a MAC address of client device 102, etc.) and additionally, or alternatively, information identifying one or more payment instruments held by user 101 (e.g., a tokenized account number, expiration date, verification code, etc.).

In further instances, merchant database 134 may include data records that identify and characterize one or more merchants, or groups of merchants, that offer products or services for sale to corresponding customers, such as user 101. For example, the data records of merchant database 134 may include information that identifies merchant 121 (e.g., a merchant name or a merchant classification code (MCC) assigned to merchant 121), along with a discrete geographic position associated with merchant 121, such as, but not limited to, a street address of a merchant 121, one or more geophysical coordinates that characterize the discrete geographic position of merchant 121 (e.g., a latitude, longitude, and/or altitude associated with merchant 121, etc.), or a street address or corresponding geophysical coordinates of a terminal device operated by merchant 121, such as terminal device 122.

In other instances, merchant 121 may be located in close proximity to one or more additional merchants, such as within a shopping mall or particular shopping district, and the data records of merchant database 134 may also include discrete geographic positions (e.g., latitudes, longitudes, altitudes, etc.) that collectively establish a virtual boundary enclosing merchant 121 and the one or more additional merchants, such as a geo-fence. The data records of merchant database 134 may store the discrete geographic positions that collectively establish the virtual boundary or geo-fence within corresponding geo-fence data, and may link the geo-fence data to the identifying information and geographic locations of merchant 121 and the one or more additional merchants. Additionally, in some instances, system data 138 may include unique network identifiers of one or more network-connected computing systems operating within environment 100, such as an IP address or a MAC address assigned to issuer system 140, payment network system 150, and/or tokenization system 160.

In some examples, the data records of transaction database 136 may identify and characterize one or more prior purchase transactions, and additionally, or alternatively, other prior data exchanges, initiated by client device 102 (e.g., a using one or more payment instruments held by user 101). Further, system data 138 may identify one or more network-connected computing systems configured to pre-authorize expected occurrences of purchase transactions or data exchanges that involve user 101 or client device 102, such as an IP address of a MAC address assigned to issuer system 140.

Issuer system 140 may be associated with, or operated by, a financial institution that issues one or more payment instruments to one or more customers of merchant 121 (e.g., a credit card account, debit card account, deposit account, etc., issued by the financial institution and held by user 101). Further, and as described herein, issuer system 140 may also be associated with, maintain, or provide, one or more application programs operated by network-connected devices operating within environment 100, such as payment application 107 executed by client device 102.

To facilitate a performance of certain of the exemplary processes described herein, issuer system 140 may maintain, within one or more tangible non-transitory memories, customer account data 142 that identifies underlying accounts (e.g., account numbers, expiration dates, card verification values, etc.) associated with each of the payment instruments issued by issuer system 140, merchant data 143 that identifies one or more merchants and other counterparties to initiated data exchanges (e.g., a merchant identifier, geographic position, etc.), and pre-authorization data 144 that identifies and characterizes one or more data exchanges pre-authorized by issuer system 140. Issuer system 140 may also maintain, within the one or more tangible, non-transitory memories, tokenization service provider (TSP) data 146 that identifies one or more network-connected computing systems (e.g., such as, but not limited to, tokenization system 160) configured to perform tokenization services on behalf of issuer system 140 or payment network system 150.

Payment network system 150 may perform operations that, in conjunction with issuer system 140, authorize initiated transactions using one or more exemplary authorization processes, and further, clear and settle authorized transactions using one or more exemplary transaction clearance and settlement processes, such as those consistent with EMV payment protocols. In certain aspects, and to facilitate a performance of these exemplary authorization, clearance, and/or settlement processes, payment network system 150 may maintain issuer data 152 and tokenization service provider (TSP) data 154 within the one or more tangible, non-transitory memories. Issuer data 152 may include data that uniquely identifies computer systems maintained by one or more issuers of payment instruments involved in transactions initiated at terminal device 122 (e.g., an IP address, MAC address, or other unique identifier of issuer system 140).

In additional instances, TSP data 154 may include information that uniquely identifies a network-connected computing system associated with one or more tokenization service providers operating within environment 100. For example, and as described herein, tokenization system 160 may provide tokenization services to payment network system 150 and additionally or alternatively, to issuer system 140, and TSP data 154 may include an IP address, a MAC address, or another unique identifier of tokenization system 160 within a corresponding communications network, such as network 120 or direct communications channel with another entity or system.

As described herein, tokenization system 160 may, upon execution of stored software instructions, perform operations that provide tokenization services to payment network system 150 and additionally or alternatively, to issuer system 140. To facilitate the provision of these exemplary tokenization services, tokenization system 160 may maintain, within on or more tangible non-transitory memories, cryptographic data 162 and a token vault 164. Cryptographic data 162 may, in some instances, include information that supports a generation and/or a decryption of one or more unique digital tokens that, when distributed to client device 102, facilitate a real-time authorization of a data exchange initiated by client device 102 at a corresponding network-connected terminal device, such as terminal device 122. Additionally, in some instances, token vault 164 may include data records that include the generated digital tokens representative of the pre-authorized data exchanges, along with the expected parameter values characterizing each of the pre-authorized data exchanges, information identifying the payment instrument associated with each of the pre-authorized data exchanges, and information characterizing the temporal and geographic validity of each of the generated digital tokens.

II. Exemplary Computer-Implemented Processes for Generating and Provisioning Digital Tokens having Limited Temporal and Geographic Validity in Real Time As described herein, client device 102 may execute one or more native application programs, which may cause client device 102 to perform operations that initiate an exchange of data with a network-connected terminal device, such as terminal device 122, across an established communications channels, such as direct peer-to-peer communications channel 120A. By way of example, terminal device 122 may be associated with or disposed within a physical location of merchant 121, such as a particular location of a Starbucks™ coffee shop, and the initiated data exchange may facilitate a purchase of a good or service offered for sale by merchant 121, e.g., coffee and pastries offered for sale by the particular location of a Starbucks™ coffee shop. Further, in some instances, the one or more executed native applications may include a payment application, such as payment application 107, that establishes and maintains a digital wallet within one or more tangible, non-transitory memories of client device 102.

To initiate the purchase transaction with merchant 121, client device 102 may transmit, to terminal device 122 across direct communications channel 120A, data that identifies and characterizes a payment instrument held by user 101 and available to fund the initiated purchase transaction (e.g., as provisioned to the digital wallet), along with additional information that uniquely identifies client device 102 or the executed payment application 107. The identifying information may include, but is not limited to, a unique cryptogram associated with client device 102 or executed payment application 107, which may be generated and formatted in accordance with one or more payment protocols, such as an EMV payment protocol). The device- or application-specific cryptogram may, in some instances, facilitate an authentication of an identity of client device 102 by terminal device 122 and by other network-connected computing systems that support the authorization of the initiated purchase transaction, such as issuer system 140 or tokenization system 160.

Further, in some examples, the data that identifies and characterizes the available payment instrument may include tokenized payment data that replaces all or a portion of the sensitive account data associated with the available payment instrument with a non-sensitive equivalent, e.g., a digital token, having no extrinsic or exploitable meaning or value. As described herein, the token may represent a reference that maps back to the sensitive account data through a network-connected computing system, such as tokenization system 160, that provides tokenization services to issuer system 140 or payment network system 150. The sensitive account data may include, among other things, an account or routing number associated with the available payment instrument, an expiration date of the payment instrument, a verification code assigned to the available payment instrument (e.g., a card verification code (CVC) or value (CVV)), or information identifying the account holder (e.g., a name, address, etc., of user 101), and examples of the tokenized data include, but are not limited to, digital token, a cryptogram, a private key, or other cryptographic data capable of masking the sensitive account information during transmission across network 120 or direct communications channel 120A.

In one instance, exchanges of tokenized payment data during one or more of the exemplary processes described herein may reduce a likelihood that a third-party device improperly accesses and exploits the sensitive account information of the available payment instrument held by user 101. Nonetheless, the mere tokenization of sensitive account information does alone eliminate an ability of that third-party device to initiate unauthorized purchase transactions that involve a payment instrument held by user 101.

For example, the third-party device may perform operations that improperly monitor and access data exchanged between client device 102 and terminal device 122 (or between other computing systems that participate in the transaction initiation and authorization processes described herein), and extract tokenized payment data representative of a payment instrument held by user 101 and selected to fund the transaction. In other examples, the third-party device may improperly access client device 102 or other network-connected systems or devices (e.g., by hacking, etc.), and extract the tokenized payment information from one or more tangible, non-transitory memories. Based on the extracted or obtained tokenized payment data, the third-party device may initiate one or more unauthorized purchase transactions by "impersonating" client device 102 and transmitting the maliciously obtained or extracted tokenized payment data to network-connected terminal devices (or software based terminal devices) operating within environment 100.

In some exemplary embodiments, as described herein, contextual transaction system 130, issuer system 140, and tokenization system 160 may perform operations that, individually or collectively, generate tokenized data that reflects a pre-authorization of a purchase transaction involving client device 102 and one or more potential counterparties, such as merchant 121 that operates terminal device 122, during a future temporal interval. The one or more counterparties, e.g., merchant 121, may be associated with geographic positions that are proximate to a monitored geographic position of client device 102, e.g., as determined by contextual transaction system 130 based on positional data received from client device 102 through secure, programmatic communications channels. Further, issuer system 140 may perform any of the exemplary processes described herein to pre-authorize the purchase transaction in accordance with an expected value of one or more transaction parameters and using a payment instrument available to and held by user 101.

The tokenized data may, for example, include a pre-authorization token characterized by a limited period of temporal validity (e.g., as bounded by the future temporal period) and further, by a limited geographic validity (e.g., derived from the geographic positions associated the one or more counterparties, such as merchant 121). In some instances, contextual transaction system 130 and additionally, or alternatively, issuer system 140, may perform operations that provision the generated tokenized data to client device 102 across network 120 through a secure, programmatic interface, e.g., an application programming interface (API) established executed payment application 107. As described herein, client device 102 may initiate a purchase transaction at terminal device 122 by transmitting the provisioned pre-authorization token across an established communications channel, e.g., direct communications channel 120A, to terminal device 122

In some examples, the authorization of an initiated data exchange, e.g., a purchase transaction initiated by client device 102 at terminal device 122, based on a pre-authorization token (or other tokenized data) characterized by a limited period of temporal validity and a limited geographic validity may increase a security of the overall transaction initiation and authorization process. Further, these exemplary authorization processes may also reduce an ability of a malicious third party to initiate fraudulent transactions via network-connected mobile devices, as the third party would not only need to intercept the tokenized data characterized by the limited temporal and geographic validity, but would also need to initiate the fraudulent transaction while proximate to a currently location of client device 102 and during the future temporal interval (e.g., to comply with the geographic and temporal restrictions imposed on the intercepted tokenized data). Certain of these exemplary processes, which initiate and authorize initiated data exchanges and transactions based on tokenized data having limited temporal and geographic validity, may be implemented in addition to, or as an alternate to, other processes that initiate and authorize transactions based on tokenized payment data.

Figure 2A:
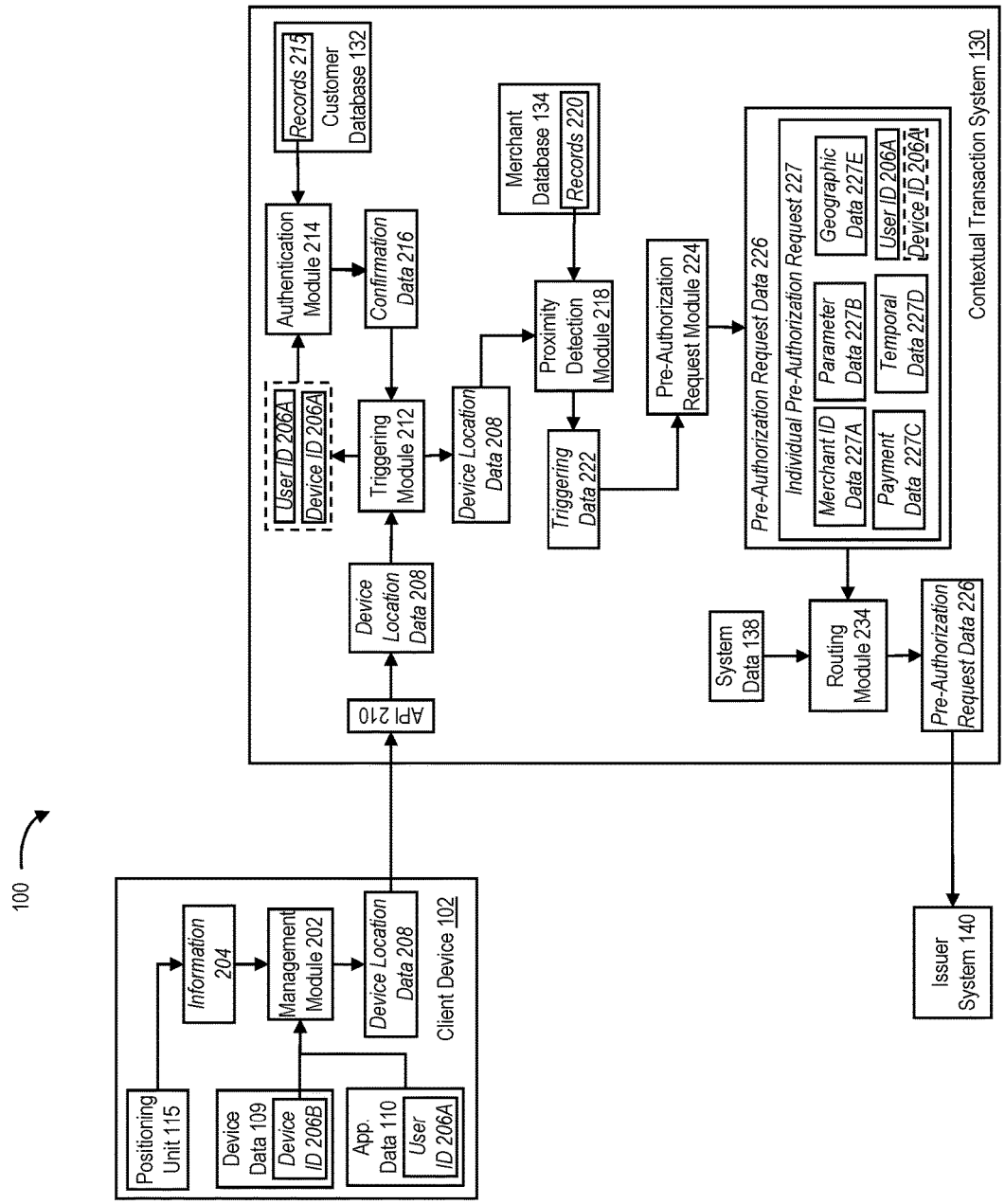

Referring to FIG. 2A, client device 102 may execute one or more native application programs, such as payment application 107 of FIG. 1, and a management module 202 of executed payment application 107 may receive, from positioning unit 115 information 204 that identifies and characterizes a current geographic position of client device 102. In some examples, information 204 may specify the current geographic position in terms of corresponding geo-spatial coordinates (e.g., a corresponding longitude, latitude, and/or altitude), and information 204 may also include temporal data specifying at time or date at which positioning unit 115 determined the current geographic position of client device 102. Further, although not illustrated in FIG. 2A, management module 202 may perform operations that store portions of information 204 within one or more tangible, non-transitory memories, e.g., within device data 109.

Management module 202 may package information 204 (e.g., which specifies the current geographic position of client device 102) into device location data 208, along with further information that uniquely identifies user 101 to contextual transaction system 130 or issuer system 140 (e.g., user identifier 206A) and additionally, or alternatively, that uniquely identifies client device 102 within environment 100 (e.g., device identifier 206B). By way of example, user identifier 206A may include an alpha-numeric authentication credential (e.g., a user name assigned to user 101 by contextual transaction system 130 or issuer system 140) or a biometric authentication credential (e.g., fingerprint data or data characterizing a digital image of a portion of user 101's face). In some instances, management module 202 may access application data 110 and extract user identifier 206A. In other instances, management module 202 may also access device data 109 and obtain device identifier 206B, examples of which include, but not limited to, an IP address or a MAC address that uniquely identifies client device 102 within environment 100.

Client device 102 may transmit device location data 208 across network 120 to contextual transaction system 130, e.g., through communications unit 112C using any appropriate communications protocol. In one example, management module 202 may generate device location data 208, and client device 102 may transmit device location data 208 to contextual transaction system 130, at predetermined intervals or in response to occurrences of certain events, such as a change in an operational mode of client device 102 or a change in a geographic position of client device 102 (e.g., a push operation). In other examples, the initiation and transmission of device location data 208 may be responsive to a receipt, by client device 102, of request data transmitted by contextual transaction system 130 (e.g., a pull operation).

As illustrated in FIG. 2A, a programmatic interface established and maintained by contextual transaction system 130, such as application programming interface (API) 210, may receive device location data 208 from client device 102. By way of example, API 210 may be associated with, and established and maintained by a triggering module 212 of contextual transaction system 180, and may facilitate direct, module-to-module communications between management module 202 of client device 102 and triggering module 212. API 210 may provide device location data 208 as an input to triggering module 212, and triggering module 212 may perform operations that parse device location data 208 to identify and extract user identifier 206A (and in some instance, device identifier 206B). Triggering module 212 may provide user identifier 206A, and in some instances, device identifier 206B, as an input to an authentication module 214 of contextual transaction system 130.

Based on user identifier 206A and/or device identifier 206B, authentication module 214 may perform operations that confirm user 101 elected participate in the exemplary token generation and transaction authorization processes described herein (e.g., the confirm user 101 is a "participating" customer). For example, authentication module 214 may access data records 215 of customer database 132, which identify and characterize one or more participating users, and may determine whether any of the participating customer are associated with user identifier 206A or device identifier 206B. If authentication module 214 were to determine that neither user identifier 206A nor device identifier 206B is associated with any of the participating customers, authentication module 214 may establish that user 101 did not elect to participate in the exemplary token generation and transaction authorization processes described herein, and contextual transaction system 130 may discard device location data 208 and await additional data transmitted by client devices operating within environment 100 (not illustrated in FIG. 2A).

Alternatively, if authentication module 214 were to determine that one of more of data records 215 includes user identifier 206A or device identifier 206B, authentication module 214 may establish that user 101 elected to participate in the exemplary dynamic token generation and provisioning processes described herein, and that user 101 represents a participating customer. Authentication module 214 may, in some instances, generate confirmation data 216 indicative of the status of user 101 as a participating customer, and provide confirmation data 216 as an additional input to triggering module 212.

Triggering module 212 may receive confirmation data 216, and responsive to the determination that user 101 is a participating customer, triggering module 212 may perform operations (not illustrated in FIG. 2A) that store device location data 208 within one or more tangible, non-transitory memories. Triggering module 212 may also provide device location data 208, which specifies the current geographic position of client device 102, as an input to a proximity detection module 218 of contextual transaction system 130. In some examples, proximity detection module 218 may perform any of the exemplary processes described herein to identify a single merchant, or a group of merchants, associated with geographic positions that are proximate to the current geographic position of client device 102, e.g., as specified within device location data 208. Based on the corresponding proximity to client device 102, and as described herein, the identified merchant, or the identified group of merchants, may each represent a potential participant in an expected purchase transaction capable of initiation by client device 102 during a future temporal interval.

In some instances, proximity detection module 218 may receive device location data 208, may perform operations that parse device location data 208 to identify and extract the current geographic position of client device 102 (e.g., as specified by a longitude, latitude, or an altitude). Proximity detection module 218 may further access merchant database 134 (e.g., as maintained locally within one or more tangible, non-transitory memories), and obtain merchant location data 220 that identifies one or more merchants that elected participate in the exemplary token generation and transaction authorization processes described herein (e.g., "participating" merchants, such as merchant 121), and characterizes a discrete geographic position, or a range of discrete geographic positions, associated with each of the identified merchants.

By way of example, merchant 121 may correspond to a Starbucks™ coffee shop located in Washington, D.C., at 2130 H Street N.W. In some instances, merchant location data 220 may include one or more merchant identifiers associated with or assigned to merchant 121, such as, but not limited to, a merchant name (e.g., the Starbucks™ coffee shop), a merchant classification code (MCC) that characterizes merchant 121, or a network identifier assigned to a terminal device operated by merchant 121 (e.g., an IP address or a MAC address assigned to terminal device 122).

In some instances, merchant location data 220 may also specify a discrete geographic position that characterizes merchant 121 (and additionally, or alternatively, terminal device 122), and may associate the particular geographic position with the one or more merchant identifiers. Examples of the discrete geographic position include, but are not limited to, a street address associated with merchant 121 or terminal device 122 or geo-spatial coordinates that characterize merchant 121 or terminal device 122 (e.g., a corresponding longitude, latitude, or altitude).

Additionally, or alternatively, merchant location data 220 may further specify a range of discrete geographic positions (e.g., geo-spatial coordinates, such as latitudes, longitudes, altitudes, etc.) that collectively establish a virtual geographic boundary, or geo-fence, enclosing merchant 121 and one or more additional merchants located in close proximity to merchant 121. For example, merchant 121 and the one or more additional merchants may be located within a shopping mall, a particular business district, or a particular shopping district, and the established virtual geographic boundary or geo-fence may enclose all or a portion of the shopping mall, the particular business district, or the particular shopping district. Further, merchant location data 220 may associate the range of discrete geographic positions with not only the one or more merchant identifiers that characterize merchant 121, but also with merchant identifiers characterizing each of the additional merchants located within the virtual boundary or geo-fence.

Referring back to FIG. 2A, and based on portions of device location data 208 and merchant location data 220, proximity detection module 218 may determine that one or more of the identified merchants (e.g., as identified within merchant location data 220) are disposed "proximate" to the current geographic position of client device 102 (e.g., as specified within device location data 208). By way of example, proximity detection module 218 may establish that a corresponding one of the identified merchants is disposed proximate to the current geographic position of client device 102 when either: (i) a discrete geographic position associated with the corresponding merchant is disposed within a threshold distance of the current geographic position of client device 102; or (ii) the current geographic position of client device 102 is located within, or is coincident with, a virtual boundary or geo-fence that encloses the corresponding merchant. In some instances, the threshold distance may be a fixed, predetermined distance established by contextual transaction system 130 or issuer system 140 (e.g., a distance of 500 meters, one kilometer, etc.), or alternatively, may vary in accordance with a speed at which client device 102 travels within a corresponding geographic area, one or more traffic or transit conditions (e.g., a transit disruption), or one or more weather conditions.

Based on the established proximity of the corresponding merchant to client device 102, proximity detection module 218 may perform operations that extract, from merchant location data 220, the one or more merchant identifiers of the corresponding merchant, along with positioning information that identifies the discrete geographic position of the corresponding merchant or the range of discrete geographic positions that establish the virtual boundary or geo-fence. In some examples, as described herein, proximity detection module 218 may perform additional operations that package the one or more extracted merchant identifiers and the extracted positioning information into corresponding portions of triggering data 222.

For example, device location data 208 may indicate that client device 102 (and thus, user 101) is currently positioned in Washington, D.C., at the corner of $22^{nd}$ and I Streets NW (e.g., 38° 54' N latitude, and 77° 02' W longitude). Further, and based on portions of merchant location data 220, proximity detection module 218 may establish that merchant 121 corresponds to a Starbucks™ coffee shop (e.g., based on the corresponding merchant identifier) associated with a discrete geographic position in Washington, D.C., at 2130 H Street N.W. (e.g., 38° 53' N latitude and 77° 3' W longitude). In some instances, proximity detection module 218 may determine that the discrete geographic position of merchant 121 is disposed within the threshold distance of the current geographic position of client device 102, and as such, that client device 102 is "proximate" to merchant 121.

As described herein, and based on the established proximity between client device 102 and merchant 121, proximity detection module 218 may extract the one or more merchant identifiers of merchant 121 (e.g., the merchant name (Starbucks™), the network identifier of terminal device 122, etc.) and the discrete geographic position (e.g., the street address of 2130 H Street N.W., or the geospatial coordinates of 38° 53' N latitude and 77° 3' W longitude), and package the one or more extracted merchant identifiers and the discrete geographic position within a portion of triggering data 222. Further, proximity detection module 218 may perform any of the exemplary processes described herein to determine a proximity between the current geographic position of client device 102 and the one or more discrete geographic positions associated with each additional or alternate merchant identified within merchant location data 220.

Referring back to FIG. 2A, proximity detection module 218 may provide triggering data 222 as an input to a pre-authorization request module 224. As described herein, triggering data 222 may include information (e.g., merchant identifiers, one or more discrete geographic positions, etc.) that identifies and characterizes one or more merchants that, based on their determined proximity to the current geographic position of client device 102, represent potential counterparties in purchase transactions initiated by client device 102. Pre-authorization request module 224 may receive triggering data 222, and may perform any of the exemplary processes described herein to generate data 226 that requests a pre-authorization of a purchase transaction involving each of the proximately disposed merchants identified within triggering data 222, such as, but not limited to, merchant 121.

Pre-authorization request module 224 may, in some instances, perform operations that package user identifier 206A (e.g., which uniquely identifies user 101 to contextual transaction system 130 or issuer system 140) and/or device identifier 206B (e.g., the IP or MAC address assigned to client device 102) into a portion of pre-authorization request data 226 (e.g., within a header portion, etc.). Further, pre-authorization module 224 may perform additional operations that establish, within corresponding portions of pre-authorization request data 226, an individual request for the pre-authorization of each of the expected purchase transactions involving client device 102 and corresponding ones of the proximately disposed merchants identified within triggering data 222, such as, but not limited to, merchant 121.

For example, triggering data 222 may establish a proximity of merchant 121 (e.g., the Starbucks™ coffee shop in Washington, D.C., at 2130 H Street N.W.) to the current geographic position of client device 102, and as such, merchant 121 may represent a potential counterparty in an expected purchase transaction, such as a purchase of oatmeal and coffee initiated at terminal device 122 by client device 102. Further, triggering data 222 may also include the one or more merchant identifiers that characterize merchant 121 (e.g., the merchant name, the MCC code, the network address of terminal device 122, etc.), along with the discrete geographic position associated with merchant 121, such as the street address (e.g., 2130 H Street, N.W.) and/or corresponding geospatial coordinates (e.g., 38° 53' N latitude and 77° 3' W longitude). Further, and based on portions of triggering data 222, pre-authorization request module 224 may perform additional operations that: (i) determine expected parameter values that characterize the purchase of the oatmeal and coffee from merchant 121 (e.g., the Starbucks™ coffee shop); (ii) generate payment data identifying the payment instrument available to fund that purchase transaction; and additionally, or alternatively, (iii) establish a temporal interval during which client device 102 is expected to initiate the purchase transaction at terminal device 122 (e.g., as operated by merchant 121).

In some examples, the expected parameters for the pre-authorization of the purchase transaction involving merchant 121 may include one or more default, merchant-specific parameter values established in accordance with one or more of payment authorization, clearance, or settlement protocols, such as an EMV-based payment protocol. For instance, pre-authorization request module 224 may access data records within merchant database 134 that are associated with a merchant identifier of merchant 121 (e.g., the merchant name, etc.), and may perform operations that extract the one or more default, merchant-specific parameter values from accessed data records. Examples of the default, merchant-specific parameter values for merchant 121 (e.g., the Starbucks™ shop) include, but are not limited to, a default transaction amount (e.g., $20.00), or a default set of expected products or services (e.g., universal product codes (UPCs) assigned to certain products offered for sale by the Starbucks™ coffee shop). In other instances, pre-authorization request module 224 may compute one or more of the expected parameter values based on an analysis of data, e.g., within transaction database 136, characterizing one or more prior purchase transactions initiated at terminal device 122 by client device 102 and additionally, or alternatively, by other client devices operating within environment 100.

Further, pre-authorization request module 224 may perform operations that identify the payment instrument available to fund the purchase transaction involving merchant 121 based on an analysis of preference data maintained within customer database 132 and additionally, or alternatively, based on any analysis of the historical transaction data maintained within transaction database 136. For example, the preference data for user 101 (e.g., as maintained within customer database 132 and associated with user identifier 206A or device identifier 206B) may identify a "preferred" payment instrument for the exemplary pre-authorization processes described herein, such as a Visa™ credit card issued by the financial institution that operates contextual transaction system 130 and issuer system 140. In some instances, pre-authorization request module 224 may extract payment data that identifies and specifies the Visa™ credit card from the accessed data records, and examples of the payment data may include, among other things, a tokenized account number, expiration date, verification code, or account-holder information, such a name or address of user 101.

In other examples, the temporal interval during which client device 102 is expected to initiate the purchase transaction at terminal device 122 (e.g., as operated by merchant 121) may correspond to a merchant-specific, default temporal interval that represents an upper bound on the temporal validity of the pre-authorized purchase transaction, e.g., as maintained within the data records merchant database 134, as described herein. Examples of the default temporal interval include, but are not limited to, five minutes, ten minutes, thirty minutes, or any additional or alternate temporal interval consistent with the exemplary payment authorization, clearance, and settlement processes described herein (e.g., an EMV-based payment protocol).

Referring back to FIG. 2A, In some instances, pre-authorization request module 224 may generate, and establish within a corresponding portion of pre-authorization request data 226, an individual request 227 for the pre-authorization of the purchase transaction involving client device 102 and merchant 121 (e.g., the purchase of oatmeal and coffee from the Starbucks™ coffee shop located in Washington, D.C., at 2130 H Street N.W.). By way of example, individual request 227 may include merchant identifier data 227A that includes the one or more merchant identifiers of merchant 121, parameter data 227B that specifies the one or more expected parameter values of the purchase transaction involving client device 102 and merchant 121, and payment data 227C that specifies the expected payment instrument available to fund the expected purchase transaction. In some instances, pre-authorization request module 224 may obtain or compute portions of parameter data 227B and payment data 227C using any of the processes described herein.

Pre-authorization request module 224 may also generate, and package within individual request 227, temporal data 227D, which specifies the temporal interval during which client device 102 is expected to initiate the purchase transaction with merchant 121 (e.g., as determined using any of the exemplary processes described herein), and geographic data 227E, which specifies the one or more discrete geographic positions associated with merchant 121. Further, in some examples, pre-authorization request module 224 may perform any of the exemplary processes described herein to generate, and establish within pre-authorization request data 226, an individual request for the pre-authorization of the each of the purchase transactions that involve client device 102 and additional, or alternate, ones of the proximately disposed merchants identified within triggering data 222.

Pre-authorization request module 224 may perform operations that provide pre-authorization request data 226 as an input to a routing module 234 of contextual transaction system 130. In some instances, routing module 234 may access system data 138 (e.g., as maintained locally within one or more tangible, non-transitory memories), and load a unique network address of a computing system configured to pre-authorize the purchase transactions. For example, and as described herein, user 101 may elect to fund each of the expected purchase transactions using the Visa™ credit card account held issued by the financial institution that operates issuer system 140, and issuer system 140 may be configured to pre-authorize each of the expected purchase transactions in accordance with respective portions of pre-authorization request data 226. In some instances, routing module 234 may extract, from system data 138, the unique network address of issuer system 140 (e.g., an IP of a MAC address assigned to issuer system 140), and may perform additional operations that cause contextual transaction system 130 to transmit pre-authorization request data 226 across network 120 to the extracted network address of issuer system 140, e.g., using any appropriate communications protocol.

Figure 2B:
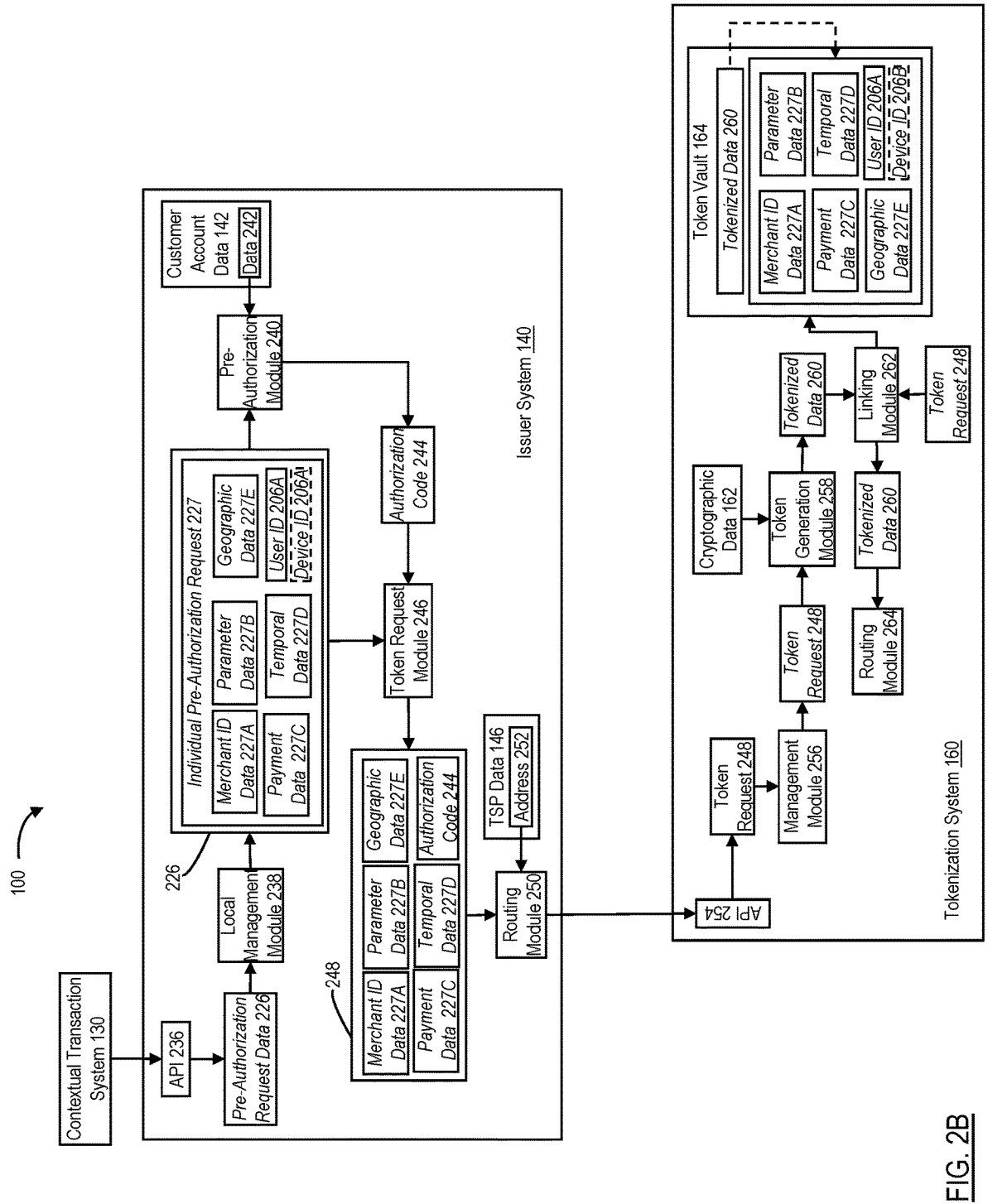

Referring to FIG. 2B, a programmatic interface established and maintained by issuer system 140, such as application programming interface (API) 236, may receive pre-authorization request data 226 from contextual transaction system 130. By way of example, API 236 may be associated with, and established and maintained by a local management module 238 of issuer system 140, and may facilitate direct, module-to-module communications between local management module 238 and routing module 234 of contextual transaction system 130. API 236 may provide pre-authorization request data 226 as an input to local management module 238, which may store pre-authorization request data 226 within one or more tangible, non-transitory memories (e.g., within a portion of pre-authorization data store 144 of FIG. 1).

Local management module 238 may, in some instances, provide pre-authorization request data 226 as an input to a pre-authorization module 240 of issuer system 140. In some instances, pre-authorization module 240 may perform any of the exemplary processes described herein to pre-authorize each of the purchase transactions (e.g., involving client device 102 and corresponding ones of the proximately disposed merchants) in accordance with respective portions of pre-authorization request data 226, such as individual request 227 for the pre-authorization of the expected purchase transaction involving client device 102 and merchant 121.

By way of example, pre-authorization module 240 may receive pre-authorization request data 226 from local management module 238, and parse pre-authorization request data 226 to extract user identifier 206A and additionally, or alternatively, device identifier 206B. In some instances, and as described herein, user identifier 206A may include an alpha-numeric character string, a biometric credential, or other appropriate authentication credential that uniquely identifies user 101 to issuer system 140), and device identifier 206B may include a unique network identifier of client device 102 within environment 100, such as the IP or MAC address assigned to client device 102.

Pre-authorization module 240 may also access stored data that identifies one or more payment instruments issued by the financial institution that operates issuer system 140, and that characterizes a current account status of each of the one or more identified payment instruments (e.g., as maintained within customer account data 142). In some instances, pre-authorization module 240 may identify one or more data records 242 within customer account data 142 that include or reference user identifier 206A or device identifier 206B, and data records 242 may identify, and characterize a current account status of, one or more payment instruments held by user 101, such as the Visa™ credit card account described herein. For example, data records 242 may specify, among other things, data identifying the Visa™ credit card account (e.g., actual or tokenized account data, such as an account number, expiration date, verification code, etc.), a current account balance or credit limit of the Visa™ credit card account, and/or values of other account parameters that characterize and facilitate a pre-authorization (or an authorization) of purchase transactions involving the Visa™ credit card account.

In some instances, pre-authorization module 240 may further parse pre-authorization request data 226 to identify an extract each of the individual requests to pre-authorize corresponding ones of the expected purchase transactions involving client device 102 and the proximately disposed merchants, including, but not limited to, individual request 227. Based on extracted data records 242, and on portions of the extracted individual requests, pre-authorization module 240 may perform any of the exemplary processes described herein to pre-authorize each of the expected purchase transactions in accordance with respective ones of the expected parameter values (e.g., an expected transaction amount, etc.) and the payment data (e.g., tokenized data identifying the selected payment instrument).

For example, pre-authorization module 240 may extract, from pre-authorization request data 226, individual request 227 for the pre-authorization of the expected purchase transaction involving client device 102 and merchant 121 (e.g., the Starbucks™ coffee shop located in Washington, D.C., at 2130 H Street N.W.). As described herein, individual request 227 may include, among other things, parameter data 227B that specifies the one or more expected parameter values of the expected purchase transaction involving client device 102 and merchant 121 (e.g., the expected transaction value of $20.00), and payment data 227C that specifies the payment instrument available to fund the expected purchase transaction (e.g., tokenized account data identifying the Visa™ credit card account).

Pre-authorization module 240 may determine whether to authorize the expected purchase transaction using the Visa™ credit card based on portions of extracted parameter data 227B, extracted payment data 227C, and extracted data records 242 that identify and characterize the Visa™ credit card account (e.g., in accordance with the one or more payment or authorization protocols, such as the EMV payment protocol). In one instance, portions of extracted data records 242 may associate tokenized account data identifying the Visa™ credit card account with the data indicative of the current account status (e.g., the account balance, available credit, credit limit, etc.), and pre-authorization module 240 may perform operations that locally determine whether to pre-authorize, or alternatively, to decline, the expected purchase transaction in accordance with the expected parameter values.

In other instances, not illustrated in FIG. 2B, extracted data records 242 may associate the data indicative of the current status of the Visa™ credit card account with portions of actual account data, and not with portions of the tokenized account data included within payment data 227C. Pre-authorization module 240 may perform additional operations that transmit all or a portion the tokenized account data (e.g., as extracted from payment data 227C) across network 120 to tokenization system 160, e.g., through secure, programmatic communications channel. Tokenization system 160 may receive the tokenized account data, e.g., through a corresponding programmatic interface, and may perform operations that access and load the actual account information associated with the tokenized account data from one or more secure data repositories, such as token vault 164 of FIG. 1. Tokenization system 160 may package and transmit the actual account information across network 120 to issuer system 140, e.g., through the secure, programmatic communications channel. Based on portions of the actual account information, pre-authorization module 240 may access the data indicative of the current status of the Visa™ credit card account (e.g., within extracted data records 242), and perform any of the exemplary processes described herein to pre-authorize, or alternatively, to decline, the expected purchase transaction in accordance with the expected parameter values.

Referring back to FIG. 2B, and in response to a decision to pre-authorize the expected purchase transaction in accordance with the expected parameter values and using the Visa™ credit card account (e.g., the expected transaction value of $20.00 would not increase the account balance of the Visa™ credit card account above the credit limit, etc.), pre-authorization module 240 may generate an authorization code 244 that confirms the pre-authorization of the expected purchase transaction. In some examples, pre-authorization module 240 may provide generated authorization code 244, along with portions of individual request 227, as inputs to a token request module 246 of issuer system 140. Alternatively, and in response to a decision to decline the expected purchase transaction (e.g., based on a determination that expected transaction value of $20.00 would increase the account balance of the Visa™ credit card account above the credit limit, that the expected purchase transaction increases a transaction velocity above a threshold value, etc.), pre-authorization module 240 may discard individual request 227 and access and additional one of the individual requests maintained with pre-authorization request data 226 for pre-authorization using any of the exemplary processes described herein.

Token generation module 246 may receive pre-authorization code 244 and individual request 227, and in some instances, may perform operations that package pre-authorization code 244, and all or a portion of individual request 227, into a token request 248 for a digital token representative of the pre-authorization of the expected purchase transaction involving client device 102 and merchant 121. For example, and as illustrated in FIG. 2B, token request module 246 may package, into token request 248, portions of individual request 227 that include, but are not limited to, merchant identifier data 227A (e.g., the one or more merchant identifiers of merchant 121), parameter data 227B (e.g., the one or more expected parameter values that characterize the pre-authorized purchase transaction), payment data 227C (e.g., tokenized data specifying the Visa™ credit card account), temporal data 227D (e.g., that specifies the temporal interval during which client device 102 is expected to initiate the purchase transaction with merchant 121), and/or geographic data 227E (e.g., that specifies the one or more discrete geographic positions associated with merchant 121). In other instances (not depicted in FIG. 2B), token request 248 may also include user identifier 206A, which uniquely identifies user 101, or device identifier 206B, which uniquely identifies client device 102 within environment 100.

In some examples, token request module 246 may provide token request 248 as an input to a routing module 250 of issuer system 140, which may receive token request 248 and extract a unique network address 252 of tokenization system 160 from one or more tangible, non-transitory memories, e.g., from TSP data 146. Routing module 250 may perform operations that cause issuer system 140 to transmit token request 248 across network 120 to network address 252 of tokenization system 160, e.g., using any appropriate communications protocols.

A programmatic interface established and maintained by tokenization system 160, such as application programming interface (API) 254, may receive token request 248 from issuer system 140. By way of example, API 254 may be associated with, and established and maintained by a management module 256 of tokenization system 160, and may facilitate direct, module-to-module communications between routing module 250 of issuer system 140 and management module 256. API 254 may provide token request 248 as an input to management module 256, which may store token request 248 within one or more tangible, non-transitory memories.

Management module 256 may also parse token request 248 to detect authorization code 244, which confirms the successful pre-authorization of the expected purchase transaction involving client device 102 and merchant 121. In response to the detection of pre-authorization code 244, management module 256 may provide token request 248 as an input to a token generation module 258 of tokenization system 160, which may perform any of the exemplary processes described here to generate tokenized data representative of the pre-authorization of the expected purchase transaction (e.g., involving client device 102 and merchant 121) in accordance with the expected parameter values and selected payment instrument (e.g., the Visa™ credit card account held by user 101).

In some examples, token generation module 258 may receive token request 248 from management module 256, and may parse token request 248 to extract, among other things, data identifying user 101 or client device 102 (such as user identifier 206A or device identifier 206B), data identifying merchant 121 (such as the merchant name from merchant identifier data 227A (e.g., the Starbucks™ coffee shop) or the merchant address from geographic data 227E (e.g., 2130 H Street N.W.)), and transaction data characterizing the pre-authorized purchase transaction (such as the expected transaction amount of $20.00, etc., from parameter data 227B). Token generation module 258 may perform any of the exemplary processes described herein to generate tokenized data 260 that is representative of a selected portion of the extracted user, device, merchant, and/or transaction data. Examples of tokenized data 260 include, but are not limited to, short-term digital token (e.g., either alone or embedded within the selected portions of the extracted user, device, merchant, and/or transaction data), a hash value, a cryptogram, a cryptographic key, or a random or pseudo-random alphanumeric character string.

In some instances, tokenized data 260 may be associated with and indicative of the pre-authorization of the purchase transaction involving client device 102 and merchant 121 (e.g., in accordance with the expected parameter values and using the expected payment instrument), and as described herein, tokenized data 260 may itself possess no extrinsic or exploitable value to malicious third parties operating within environment 100. Further, and as also described herein, tokenized data 260 may be characterized by a limited period of temporal validity (e.g., as established by the temporal interval specified within temporal data 227D) and a limited geographic validity (e.g., as established by the discrete geographic positions specified within geographic data 227E).

Referring back to FIG. 2B, token generation module 258 may access elements of cryptographic data 162 (e.g., as maintained by tokenization system 160 within one or more tangible, non-transitory memories), and may generate tokenized data 260 in accordance with the accessed elements of cryptographic data 162. For example, the accessed elements of cryptographic data 162 may specify a particular tokenization scheme, including, but not limited to, a predetermined length (e.g., ten characters, fifteen characters, etc.), a predetermined composition (e.g., numerals from zero to nine, etc.), or a predetermined structure (e.g., a specified number of leading or training zeros, etc.) of a corresponding digital token. The accessed elements of cryptographic data 162 may also specify the selected portion of the extracted user, device, merchant, and/or transaction data subject to tokenization, and additionally, or alternatively, a particular sensitive element of that selected portion suitable for replacement by the corresponding digital token.

In other examples, the accessed elements of cryptographic data 162 may also specify one or more functions or algorithms that, when applied to the selected portion of the extracted user, device, merchant, and/or transaction data, generated tokenized data in accordance with the predetermined length, composition, or structure. Examples of the functions or algorithms include, but are not limited to, a hash function (e.g., a MD5 hash function, an SHA-1 or an SHA-2 hash function, etc.), one or more a key-generation algorithm, a random number generation algorithm, and/or a pseudo-random number generation algorithm. The disclosed embodiments are, however, not limited to these exemplary elements of cryptographic data 162, and in other instances, cryptographic data 162 may include any additional or alternate information that supports the generation or provisioning of tokenized data 260, including one or more previously generated elements of tokenized data (e.g., digital tokens, cryptograms, cryptographic keys, random or pseudo-random numbers, etc.) and any of the supporting cryptographic data described herein.

Referring back to FIG. 2B, token generation module 258 may provide tokenized data 260 as an input to a linking module 262. In some instances, linking module 262 may access locally stored token request 248, e.g., as maintained within the one or more transitory memories, and perform operations that store tokenized data 260 and portions of token request 248 within one or more portions of token vault 164. For example, linking module 262 may parse token request 248 to extract merchant identifier data 227A, parameter data 227B, payment data 227C, temporal data 227D, and geographic data 227E. Linking module 262 may also access token vault 164, and store, within token vault 164, tokenized data 260 in conjunction with certain ones of merchant identifier data 227A, parameter data 227B, payment data 227C, temporal data 227D, and/or geographic data 227E, along with data that identifies user 101 (e.g., user identifier 206A) or client device 102 (e.g., device identifier 206B).

In some examples, as described herein, the association between tokenized data 260 and each of merchant identifier data 227A, temporal data 227D and geographic data 227E, as established within token vault 164, may impose a temporal limitation (e.g., based on the temporal interval specified within temporal data 227D) and a geographic limitation (e.g., based on the discrete geographic positions specified within geographic data 227E and or the identifier of merchant 121 specified within merchant identifier data 227A) on a validity of tokenized data 260. Further, token vault 164 may associate tokenized data 260 with actual account data (e.g., an actual account number, expiration date, verification code, or cardholder information) associated with the payment instrument selected to fund the pre-authorized and expected purchase transaction (e.g., the Visa™ credit card identified within payment data 227C).

Linking module 262 may also provide tokenized data 260 as an input to a routing module 264 of tokenization system 160. In some instances, routing module 264 may access a unique network identifier of issuer system 140, such as an IP address or a MAC address, and may perform operations that cause tokenization system 160 to transmit tokenized data 260 to issuer system 140, e.g., using any appropriate communications protocol. As described below in reference to FIG. 2C, issuer system 140 may perform any of the exemplary processes described herein to provision tokenized data to one or more network-connected devices operated by or associated with user 101, such as client device 102.

Referring to FIG. 2C, a programmatic interface established or maintained by issuer system 140, such as application programming interface (API) 266, may receive tokenized data 260 from tokenization system 160, and API 266 may route tokenized data 260 to a provisioning module 268 of issuer system 140. In some instances, API 266 may facilitate secure, module-to-module communications between provisioning module 268 and routing module 264 of tokenization system 160. Further, provisioning module 268 may receive tokenized data 260, and may perform additional operations that store tokenized data 260 within one or more tangible, non-transitory memories, e.g., within pre-authorization data store 144, and that package portions of tokenization data 260 into a provisioning package 270.

Provisioning module 268 may also access locally stored pre-authorization request data 226 and extract device identifier 206B, e.g., the IP or MAC address of client device 102. In some examples, provisioning module 268 may provide device identifier 206B and provisioning package 270 as inputs to routing module 272, which may perform operations that cause issuer system 140 to transmit provisioning package 270 across network 120 to the unique network address of client device 102, e.g., using any appropriate communications protocol, either directly or through a secure, programmatic communications channel established and maintained by contextual transaction system 130 (e.g., based on secure application-to-application communications).

In some examples, a programmatic interface established and maintained by client device 102, e.g., application programming interface (API) 274 may receive provisioning package 270 from issuer system 140. API 274 may provide provisioning package 270 as an input to a local provisioning module 276 of client device 102, which may perform any of the exemplary processes described herein to automatically provision tokenization data 260, which represents the pre-authorized purchase transaction involving client device 102 and terminal device 122 of merchant 121, to client device 102 prior to the expected future occurrence of the purchase transaction automatically and without intervention from user 101.

In some examples, local provisioning module 276 may be associated with, or represent a component of, payment application 107 that, when executed by client device 102, establishes and maintains a mobile wallet provisioned with one or more payment instruments (e.g., digital tokens) available for use in transactions initiated by client device 102. As illustrated in FIG. 2C, local provisioning module 276 may process provisioning package 270, extract tokenized data 260 (e.g., which represents the pre-authorized purchase transaction involving client device 102 and terminal device 122) and store tokenized data 260 within a corresponding portion of application data 110, e.g., as provisioned token data 278.

Local provisioning module 276 may perform further operations that extract, provisioning package 270, supporting data that characterizes or identifies tokenized data 260 or the pre-authorized purchase transaction, such as one or more identifies of merchant 121 (e.g., the Starbucks™ coffee shop) or the selected payment instrument selected to fund the pre-authorized purchase transaction (e.g., the Visa™ credit card held by user 101, etc.). Upon storage within provisioned token data 278 (e.g., alone or in conjunction with elements of the supporting data described herein), tokenized data 260 may be provisioned for use in transactions initiated by client device 102 at corresponding POS terminals, such as the expected occurrence of the purchase transaction initiated by client device 102 at terminal device 122.

In some instances, tokenized data 260 may be characterized by a limited geographic validity (e.g., as established by the one or more discrete geographic positions within geographic data 227E, such as a geographic position associated with merchant 121 or terminal device 122) and further, by a limited period of temporal validity (e.g., as established by temporal data 227D, which specifies the temporal interval during which client device 102 is expected to initiate the purchase transaction with merchant 121). For example, as tokenized data 260 may include a short-term digital token (e.g., either alone or embedded within the selected portions of the extracted user, device, merchant, and/or transaction data) valid for a fifteen-minute period (e.g., subsequent to a generation by tokenization system 160) within a predetermined distance of a geographic location associated with merchant 121 (e.g., within three meters of one or more terminal devices, such as terminal device 122, located within the Starbucks™ coffee shop in Washington, D.C., at 2130 H Street N.W.).

The limited temporal and/or geographic validity of tokenization data 260 may, in some examples, reduce an ability of a malicious third party to initiate fraudulent transactions via network-connected mobile devices, as the third party would not only tokenized authorization request 416 need to intercept tokenized data 260, but would also need to initiate the fraudulent transaction while proximate to a current geographic position of client device 102 and during the specified temporal interval, e.g., to comply with the geographic and temporal restrictions imposed on intercepted tokenized data 260. Certain of these exemplary processes, which initiate and authorize initiated data exchanges and transactions based on tokenized data having limited temporal and geographic validity, may be implemented in addition to, or as an alternate to, other processes that initiate and authorize transactions based on tokenized payment data.

Figure 3A:
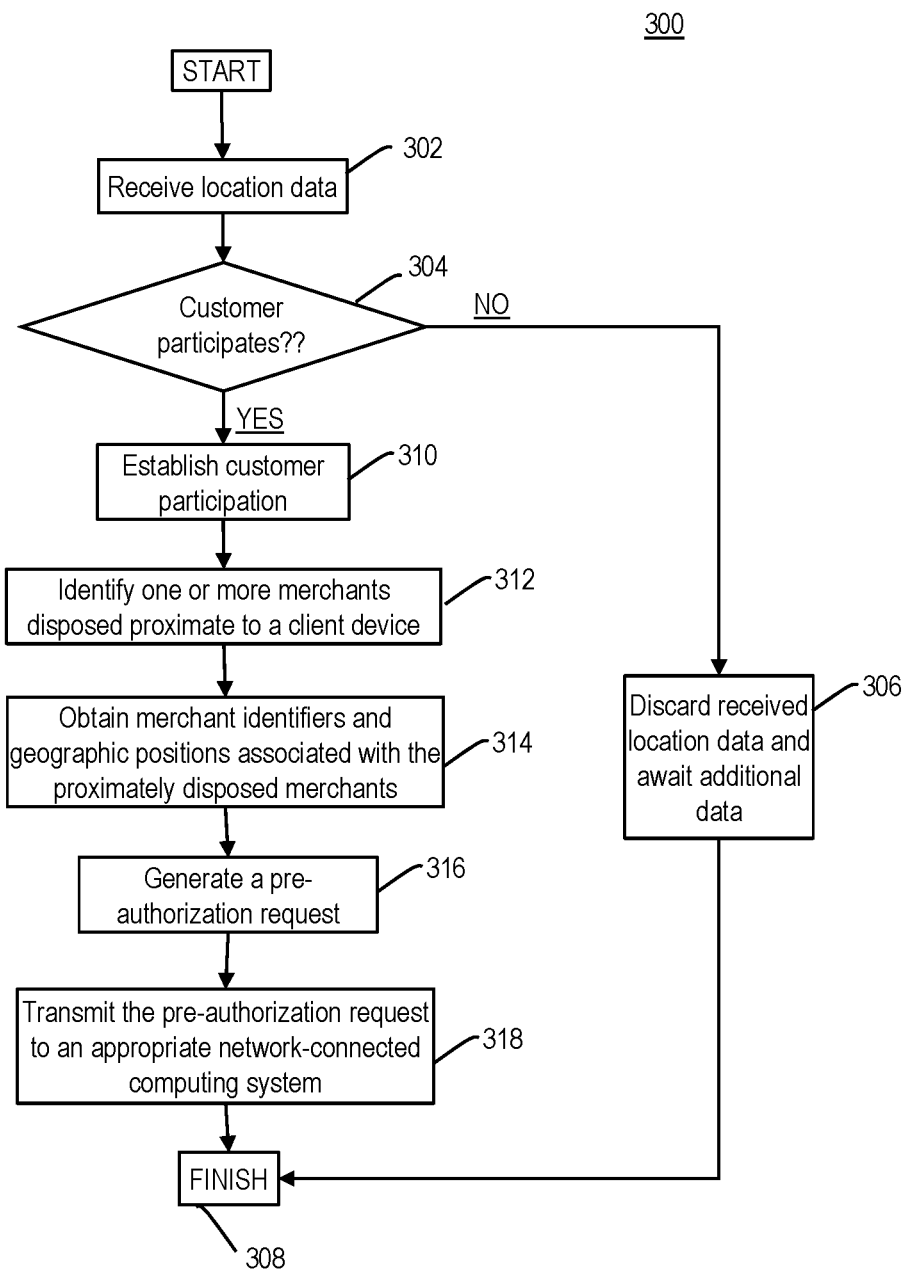
FIG. 3A is a flowchart of an exemplary process for adaptively determining a counterparty to an expected data exchange involving a network-connected computing device, consistent with the disclosed embodiments.

FIG. 3A is a flowchart of an exemplary process 300 for adaptively determining a counterparty to an expected of a data exchange involving a network-connected computing device, in accordance with disclosed exemplary embodiments. In one example, as described herein, the counterparty may correspond to a physical or digital merchant, such as merchant 121 of FIG. 1, that offers goods or services for sale to one or more customers, such as user 101 of FIG. 1, and the expected occurrence of the data exchange may include an initiation of a purchase transaction by the network-connected computing device, such as client device 102 of FIG. 1, at corresponding physical or electronic point-of-sale (POS) terminal operated by the merchants, such as terminal device 122 of FIG. 1. In some examples, contextual transaction system 130, which may be associated with an application program executed by client device 102 (e.g., executed payment application 107) may perform the steps of exemplary process 300. In other examples, and consistent with the disclosed exemplary embodiments, issuer system 140 may perform all or a portion of the steps of exemplary process 300.

Referring to FIG. 3A, contextual transaction system 130 (or issuer system 140) may receive location data specifying a current geographic position of client device 102 (e.g., in step 302). The received location data may, for example, specify the current geographic position of client device 102 in terms of one or more geospatial coordinates (e.g., a longitude, latitude, and/or altitude). The received location data may also include a unique identifier of user 101 (e.g., an authentication or login credential associated with payment application 107, such as an alphanumeric character string or a biometric credential) and in some instances, may also include a unique device identifier (e.g., an IP address or a MAC address assigned to client device 102).

In some examples, all or a portion of the location data may be generated by an application program executed by client device 102 (e.g., executed payment application 107), and contextual transaction system 130 (or issuer system 140) may receive location data may receive the location data from client device 102 at predetermined intervals, or in response to occurrences of certain events, such as a change in an operational mode of client device 102 or a change in a geographic position of client device 102 (e.g., a push operation). In other examples, client device 102 may generate and transmit the location data to contextual transaction system 130 (or issuer system 140) in response a receipt of request data transmitted by contextual transaction system 130 or issuer system 140 (e.g., a pull operation).

In step 304, and based on portions of the received location data, contextual transaction system 130 (or issuer system 140) may perform operations to confirm that user 101 elected participate in the exemplary token generation and transaction authorization processes described herein, e.g., the confirm user 101 is a "participating" customer. For example, in step 304, transaction system 130 (or issuer system 140) may extract the user identifier and additionally, or alternatively, the device identifier, from the received location data, and may access data records (e.g., as maintained within customer database 132 of FIG. 1) that identify and characterize one or more participating users, and determine whether the accessed customer data records include the extracted user identifier and/or device identifier.

In one instance, if contextual transaction system 130 (or issuer system 140) were to determine that the accessed customer data records include neither the extracted user identifier nor the extracted device identifier (e.g., step 304; NO), contextual transaction system 130 (or issuer system 140) may establish that user 101 did not elect to participate in the exemplary token generation and transaction authorization processes described herein. Contextual transaction system 130 (or issuer system 140) may perform additional operations that discard the received location data, and await a receipt of additional location data transmitted by client device 102 and other network-connected devices operating within environment 100 (e.g., in step 306). Exemplary process 300 is then complete in step 308.

Alternatively, if contextual transaction system 130 (or issuer system 140) were to determine that one of more of the accessed customer data records includes the user identifier or the device identifier 206B (e.g., step 304; YES), contextual transaction system 130 (or issuer system 140) may establish that user 101 elected to participate in the exemplary dynamic token generation and provisioning processes described herein, and that user 101 represents a participating customer (e.g., in step 310). In some examples, contextual transaction system 130 (or issuer system 140) may perform any of the exemplary processes described herein to identify a single merchant, or a group of merchants, associated with geographic positions that are proximate to the current geographic position of client device 102, as specified within the received location data (e.g., in step 312). Based on the corresponding proximity to client device 102, and as described herein, the identified merchant, or the identified group of merchants, may each represent a potential counterparty in an expected occurrence of a purchase transaction involving client device 102, and thus, user 101.

For example, in step 312, contextual transaction system 130 (or issuer system 140) may parse the received location data to extract the current geographic position of client device 102. Further, contextual transaction system 130 (or issuer system 140) may access merchant data (e.g., as maintained within merchant database 134 of FIG. 1) that identifies one or more merchants that participate in the exemplary token generation and transaction authorization processes described herein (e.g., "participating" merchants, such as merchant 121), and that characterizes a discrete geographic position, or a range of discrete geographic positions, associated with each of the participating merchants.

As described herein, the data identifying each of the participating merchants may include, but is not limited to, a merchant name, a merchant classification code (MCC) that characterizes the merchant, or a network identifier assigned to a terminal device operated by the merchant (e.g., an IP address or a MAC address assigned to terminal device 122). Further, each of the discrete geographic positions may be characterized by corresponding geospatial coordinates (e.g., a longitude, latitude, or altitude), and the range of discrete geographic positions may correspond to a virtual boundary or a geo-fence that encloses one or more of the participating merchants, such as merchant 121.

Based on portions of the accessed merchant data, contextual transaction system 130 (or issuer system 140) may determine that the current geographic position of client device 102 is disposed within a threshold distance of the discrete geographic position associated with one or more of the participating merchants, or is disposed within, or is coincident with, a virtual boundary or geo-fence associated with the one or more participating merchants (e.g., in step 312). In some examples, contextual transaction system 130 (or issuer system 140) may establish that each of the one or more participating merchants is disposed "proximate" to client device 102, and contextual transaction system 130 (or issuer system 140) may perform any of the exemplary processes described above to extract, from the accessed merchant data: (i) merchant data that includes the merchant identifiers associated with the proximately disposed merchants' and additionally, or alternatively, (ii) geographic data that includes the discrete geographic positions, or ranges of discrete geographic positions, associated with the proximately disposed merchants (e.g., in step 314).

Contextual transaction system 130 (or issuer system 140) may generate request to pre-authorize a purchase transaction involving client device 102 (and as such, user 101) and each of the proximately disposed merchants (e.g., in step 316). The generated pre-authorization request may, for example, include the extracted merchant and geographic data. Further, the pre-authorization request may also include an expected value of one or more transaction parameters that characterize each of the purchase transactions (e.g., a pre-authorized transaction amount, a pre-authorized product or service, etc.), data characterizing a payment instrument capable of funding each of the purchase transactions (e.g., tokenized account information, such as a tokenized account number, expiration date, or verification code), and additionally, or alternatively, data specifying a particular time period, or temporal interval, during which each of the purchase transactions is expected to occur. In some instances, contextual transaction system 130 (or issuer system 140) may generate, identify, or obtain the transaction parameter values, the payment instrument data, or the temporal data using any of the exemplary processes described herein.

In some examples, contextual transaction system 130 (or issuer system 140) may transmit the pre-authorization request across network 120 to a network-connected computing system configured to pre-authorize each of the purchase transactions in accordance with the transaction parameter values, the payment instrument information, or the temporal information (e.g., in step 318). For instance, in step 318, contextual transaction system 130 may transmit the pre-authorization request across network 120 to issuer system 140. In other instances, (not depicted in FIG., 3A), issuer system 140 may generate the pre-authorization request (e.g., in step 316), and perform operations that locally pre-authorize each of the purchase transactions using any of the exemplary processes described herein. Exemplary process 300 is then complete in step 308.

Figure 3B:
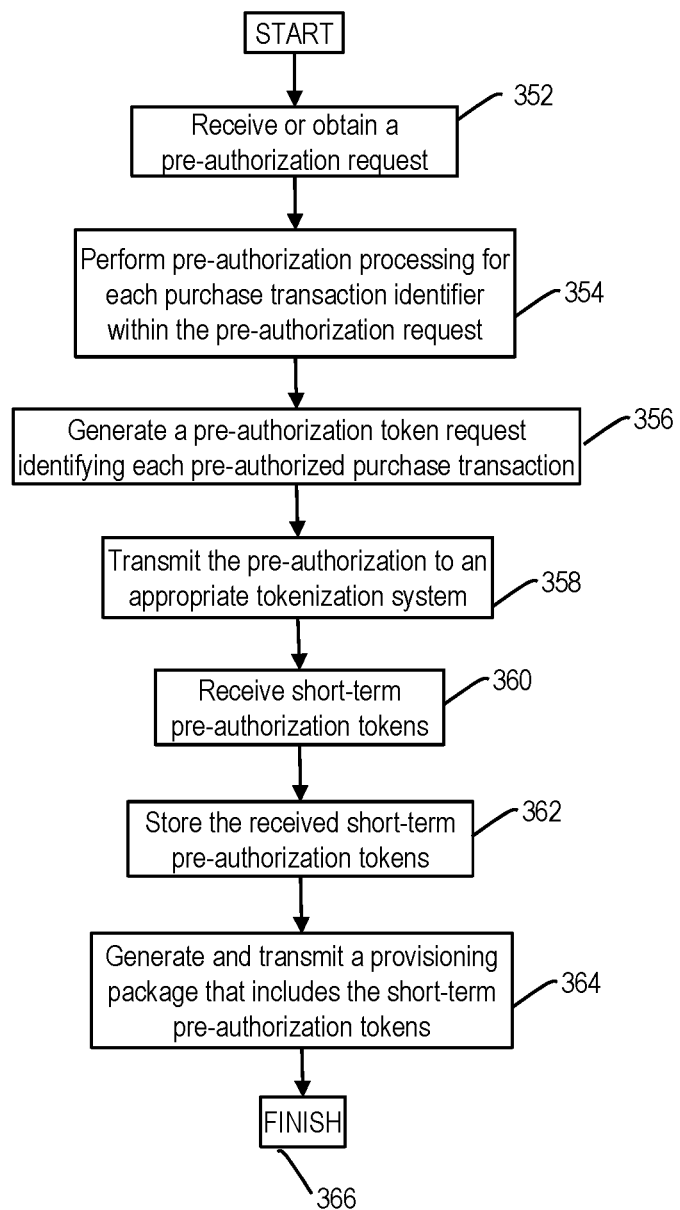
FIG. 3B is a flowchart of an exemplary process for generating and provisioning short-term pre-authorization tokens to a network-connected computing device, consistent with the disclosed embodiments.

FIG. 3B is a flowchart of an exemplary process 350 for generate and provisioning short-term pre-authorization tokens to a network-connected computing device, in accordance with disclosed exemplary embodiments. In one example, each of the short-term pre-authorization tokens may be associated with a pre-authorization of an exchange of data, such as a pre-authorization of a purchase transaction, subject to initiation by client device 102 and a terminal device of a corresponding counterparty, such as terminal device 122 of merchant 121. Further, an as described herein, each of the short-term pre-authorization tokens may be characterized by a limited period of temporal validity and additionally, or alternatively, a limited range of geographic validity. In some instances, issuer system 140 may perform all or a portion of the steps of exemplary process 350.

Referring to FIG. 3B, issuer system 140 may receive or obtain a request to pre-authorize one or more purchase transactions subject to initiation by client device 102 during corresponding temporal intervals (e.g., in step 352). As described herein, each of the purchase transactions may be associated with a corresponding counterparty merchant, such a merchant 121 of FIG. 1, and may involve a user that operates client device 102, such as user 101 of FIG. 1. In some instances, and for each of the purchase transactions, the received pre-authorization request may include a unique identifier of user 101 (e.g., an alphanumeric or biometric authentication credential), a unique identifier of client device 102 (e.g., an IP address or a MAC address), and/or merchant data that identifies and characterizes each of the counterparty merchants (e.g., the merchant identifiers described above, discrete geographic positions of the counterparty merchants, etc.).

Further, in additional examples, the pre-authorization request may also include parameter data specifying an expected value of one or more transaction parameters that characterize each of the purchase transactions (e.g., a pre-authorized transaction amount, a pre-authorized product or service, etc.), and payment instrument data characterizing a payment instrument capable of funding each of the purchase transactions (e.g., tokenized account information, such as a tokenized account number, expiration date, or verification code). The pre-authorization request may also include temporal data that specifies a particular time period, or temporal interval, during which each of the purchase transactions is expected to occur.

Issuer system 140 may perform any of the exemplary processes described herein to pre-authorize, or alternatively, to decline, each of the purchase transactions specified within the received payment request in accordance with corresponding portions of the parameter data and the payment instrument data (e.g., in step 354). Further, and as described herein, issuer system 140 may also generate a pre-authorization code for each of the pre-authorized purchase transactions in step 354, and may discard information characterizing each of the now-declined purchase transactions.

Further, issuer system 140 may perform also operations that generate a pre-authorization token request that identifies and characterizes each of the pre-authorized purchase transactions (e.g., in step 356). By way of example, and for each of the pre-authorized purchase transactions, the pre-authorization token request may include, but is not limited to, the generated authorization code, the user or device identifier, a corresponding portions of the merchant data (e.g., that identifies the counterparty merchant), and corresponding portions of the parameter, payment instrument, and temporal data. The disclosed embodiments are, however, not limited to these pre-authorization token requests that include exemplary components, and in other examples, the pre-authorization token request may include any additional or alternate information, including a subset of the information described herein, capable of identifying each of the pre-authorized purchase transactions.

In some examples, issuer system 140 may transmit the pre-authorization token request to one or more network-connected computing systems configured to provide tokenization services to issuer system 140, such as tokenization system 160 (e.g., in step 358). Tokenization system 160 may receive the pre-authorization token request, and may perform any of the exemplary processes described herein to generate a short term pre-authorization token (e.g., characterized by a limited temporal and/or geographic validity) for each of the pre-authorized purchase transactions, and to store each of the short term pre-authorization tokens within a secure data repository, such as token vault 164 of FIG. 1. Further, tokenization system 160 may also associate or link, within token vault 164, each of the short term pre-authorization tokens with the corresponding generated authorization code, the user or device identifier, the corresponding portion of the merchant data, and the corresponding portions of the parameter, payment instrument, and temporal data. In some instances, and as described herein, tokenization system 160 may perform additional operations that package and transmit each of the generated pre-authorization tokens across network 120 to issuer system 140, e.g., using any of the secure communications protocols described herein.

Referring back to FIG. 3B, issuer system 140 may receive the newly generated short-term pre-authorization tokens from tokenization system 160 (e.g., in step 360), and perform additional operations that store the short-term pre-authorization tokens within one or more tangible, non-transitory memories, such as within pre-authorization data store 144 of FIG. 1 (e.g., in step 362). In some instances, issuer system 140 may perform any of the exemplary processes described herein to package each of the short-term pre-authorization tokens into a provisioning package, which issuer system 140 may transmit across network 120 to client device 102 using any appropriate communications protocol (e.g., in step 364). As described herein, client device 102 may receive the provisioning package, and an application program executed by client device 102 may perform any of the exemplary processes described herein to provision the short-term pre-authorization tokens to client device 102 (e.g., to a digital wallet maintained by payment application 107) automatically and without intervention from user 101. Exemplary process 350 is then complete in step 366.

III. Exemplary Computer-Implemented Processes for Authorizing Exchanges of Data in Real Time Using Digital Tokens Having Limited Temporal and Geographic Validity As described herein, client device 102 may execute one or more native application programs, which may cause client device 102 to perform operations that initiate an exchange of data with a network-connected terminal device, such as terminal device 122, across an established communications channels, such as direct peer-to-peer communications channel 120A. For example, terminal device 122 may be associated with or disposed within a physical location of merchant 121, such as an Starbucks™ coffee shop located in Washington, D.C., at 2130 H Street N.W., and user 101 may enter the Starbucks™ coffee shop, and may place an order to purchase coffee and oatmeal at 8:45 a.m. on Thursday, Mar. 1, 2018.

A cash register or other computing system maintained by at the Starbucks™ coffee shop (e.g., which corresponds to merchant 121 of FIG. 1) may obtain transaction data characterizing the purchase transaction (e.g., a transaction value of $7.25, identifiers of the purchase coffee and oatmeal, etc.), and provide the obtained transaction data to terminal device 122 across any appropriate wired or wireless connection. Terminal device 122 may receive the transaction data from the merchant computing system, and may perform operations that generate interface elements representative of portions of the received transaction data, which terminal device 122 may present within a graphical user interface (GUI) displayed on display unit 127A.

In response to the presented interface elements, which may prompt user 101 to provide a payment instrument capable of funding the transaction amount of the initiated transaction, user 101 may dispose client device 102 proximate to terminal device 122, and interface unit 114 of client device 102 may establish communications channel 120A with terminal device 122 (e.g., through the communications device included within interface unit 128 of terminal device 122 using any of the short-range, wireless communication protocols described above). In some instances, processor 104 of client device 102 may execute a payment application, e.g., payment application 107, which may cause client device 102 to present, to user 101 through display unit 112A, one or more interface elements that identify a presence of provisioned tokenized data associated with the purchase transaction (e.g., based on the stored elements of supporting data that identify merchant 121 or terminal device 122). The presented interface elements may also prompt user 101 to provide input to client device 102 that confirms an initiation of the purchase transaction, e.g., the purchase of the coffee and oatmeal, using on the provisioned tokenized data.

For example, user 101 may decide to initiate the purchase transaction using the provisioned tokenized data (e.g., the $7.25 purchase of oatmeal and coffee from the Starbucks™ coffee shop), and may provide input data indicative of that decision to client device 102, e.g., by providing input data 301 to input unit 112B. In some instances, input data 401 may include one or more authentication credentials, such as, but not limited to, an alphanumeric character string or a biometric authentication credential (e.g., data indicative of a fingerprint scan or a captured facial image), and executed payment application 107 may perform operations that authenticate an identity of user 101 based on input data 401.

Figure 4A:
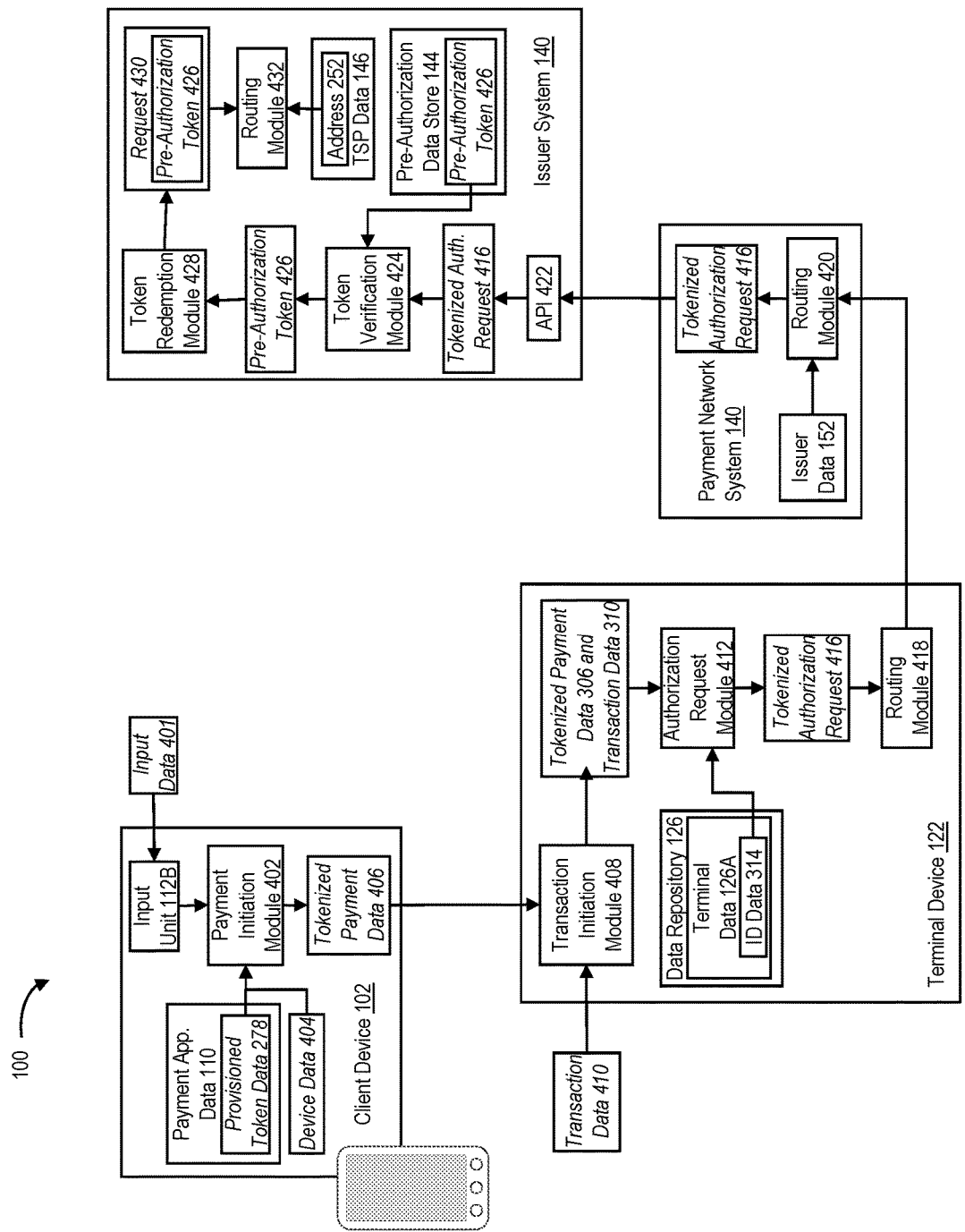
FIGS. 4A and 4B are diagrams illustrating portions of an exemplary computing environment, consistent with the disclosed embodiments.

Referring to FIG. 4A, a payment initiation module 402 of executed payment application 107 may receive input data 401 that confirms the decision of user 101 to initiate the purchase transaction, e.g., the $7.25 purchase of coffee and oatmeal from the Starbucks™ coffee shop. As described herein, input data 401 may include the one or more authentication credentials of user 101, and in some instances (not illustrated in FIG. 4A), payment initiation module 402 may authenticate an identity of user 101 (and as such, a permission of user 101 to initiate the purchase transaction) based on a comparison of the one or more authentication credentials with portions of authentication data stored locally within one or more tangible, non-transitory memories. Responsive to a successful authentication of user 101's identity, payment initiation module 402 may perform operations that access a corresponding portion of application data 110 (e.g., as maintained within data repository 108 of FIG. 1), and identify and load one or more portions of provisioned token data 278, which includes tokenized data provisioned to client device 102 using any of the processes described herein.

In some instances, provisioned token data 278 may include, but is not limited to, a short-term digital token, e.g., either alone or embedded within the selected portions of data characterizing user 101, client device 102, merchant 121, or an expected occurrence of a purchase transaction initiated at terminal device 122 by client device 102. The short-term digital token may, for example, be characterized by a limited period of temporal validity (e.g., a predetermined time period subsequent to a generation and provisioning of the short-term digital token to client device 102), and a limited geographic validity (e.g., as established by one or more discrete geographic positions associated with merchant 121, or by a virtual geographic boundary that encloses the one or more discrete geographic positions, such as a geofence).

Further, and as described herein, the short-term digital token, e.g., a pre-authorization token, may be indicative of a pre-authorization of an expected occurrence of a purchase transaction initiated by client device 102 at terminal device 122 (e.g., by issuer system 140 in accordance with one or more expected parameter values, such as an expected transaction value, and funded by a payment instrument held by user 101, such as the Visa™ credit card). The disclosed embodiments are, however, not limited to these examples of tokenized data, and in other instances, provisioned token data 278 may include additional or alternate digital tokens having various temporal or geographic validities (e.g., a hash value, cryptogram, cryptographic key, random or pseudo-random number, etc.) and/or other information facilitating an initiation, authorization, settlement, and clearance of transaction in accordance with one or more payment or authorization protocols, such as the EMV payment protocol described herein.

Referring back to FIG. 4A, payment initiation module 402 may perform additional operations that access and load, from corresponding portions of data repository 108, device data 404 that uniquely identifies client device 102 within environment 100 (e.g., an IP address, a MAC address, a unique identifier of user 101, etc.). Payment initiation module 402 may package portions of provisioned token data 278 (e.g., the short-term digital token) and device data 404 into tokenized payment data 406, which client device 102 may transmit across communications channel 120A to terminal device 122 using any of the short-range communications protocols outlined above. In some examples, not illustrated in FIG. 4A, tokenized payment data 406 may also include cryptographic data that identifies and authenticates the mobile wallet established and maintained by executed payment application 107, such a mobile wallet token, a EMV-compatible cryptogram, or a unique mobile wallet address.

A transaction initiation module 408 of terminal device 122 may receive tokenized payment data 406 from client device 102, and further, may receive transaction data 410 from the merchant computing system, e.g., the cash register operated by merchant 121. Transaction data 410 may, for example, include data characterizing the initiated transaction, such as, but not limited to, the corresponding transaction value (e.g., $7.25), the corresponding transaction time or date (e.g., 8:45 a.m. on Mar. 1, 2018), and the identifier of the product or products involved in the transaction (e.g., the UPCs assigned to the oatmeal and the coffee). In some aspects, transaction initiation module 408 may provide portions of tokenized payment data 406 and transaction data 410 as an input to an authorization request module 412, which may perform any of the exemplary processes described herein to generate an authorization request for the initiated transaction.

For example, authorization request module 412 may receive tokenized payment data 406 and transaction data 410, and may perform additional operations that access and load data identifying terminal device 122, e.g., terminal identification data 414, from a corresponding portion of data repository 126, e.g., from terminal data 126A. In some instances, terminal identification data 414 may include a unique network address of terminal device 122 within environment 100, such as an IP address or a MAC address. Further, in some instances, terminal identification data 414 may also include one or more discrete geographic positions associated with terminal device 122 and additionally, or alternatively, with merchant 121.

In other instances, terminal identification data 414 may include a cryptogram that uniquely identifies terminal device 122, which may be generated and assigned to terminal device 122 by payment network system 150. The cryptogram may, for example, be formatted in accordance with one or more appropriate payment or authorization protocols, such as the EMV payment protocol described herein. Authorization request module 412 may perform operations that package tokenized payment data 406, transaction data 410, and terminal identification data 414 into a tokenized authorization request 416. As described herein, tokenized authorization request 416 may include the pre-authorization token or other element of tokenized data indicative of the pre-authorization of the expected occurrence of the purchase transaction initiated by client device 102 at terminal device 122.

As illustrated in FIG. 4A, authorization request module 412 may provide tokenized authorization request 416 as an input to a routing module 418 of terminal device 122, which may that transmit tokenized authorization request 416 across network 120 to payment network system 150, e.g., through communications unit 127C using any of the communications protocols outlined above. In some instances, terminal device 122 may transmit tokenized authorization request 416 directly to a network address of payment network system 150, or alternatively, through one or more intermediate computing systems, such as a computing system operated by an acquirer associated with terminal device 122 and/or merchant 121.

A routing module 420 of payment network system 150 may receive tokenized authorization request 416 (e.g., directly from terminal device 122 or from the one or more intermediate computing systems, such as the computing system maintained by the acquirer). In some aspects, routing module 420 may access issuer data 152 and extract a network address of an issuer system associated with the short-term digital token incorporated within tokenized payment data 406 (e.g., a MAC address or IP address of issuer system 140, which issued the payment instrument facilitating the pre-authorization of the expected occurrence of the purchase transaction involving merchant 121, e.g., the Visa™ credit card held by user 101). Routing module 429 may transmit tokenized authorization request 416 across network 120 to the extracted network address of issuer system 140, e.g., using any of the communications protocols described above.

A programmatic interface established and maintained by issuer system 140, e.g., application programming interface (API) 422 may receive tokenized authorization request 416 from payment network system 150. By way of example, API 422 may be associated with, and established and maintained by a token verification module 424 of issuer system 140, and may facilitate direct, module-to-module communications between routing module 420 of payment network system 150 and token verification module 424. API 422 may provide tokenized authorization request 416 as an input to token verification module 424, which may perform operations that store tokenized authorization request 416 within one or more tangible, non-transitory memories. In some instances, token verification module 424 may parse tokenized authorization request 416 to extract provisioned token data 278, which may include a short-term digital token, e.g., pre-authorization token 426, provisioned to client device 102 using any of the exemplary processes described herein.

Token verification module 424 may also access pre-authorization data store 144 (e.g., as maintained within the one or more tangible, non-transitory memories). In some instances, pre-authorization data store 144 may maintain, within one or more data records, information that identifies and characterizes one or more expected purchase transaction pre-authorized by issuer system 140. For example, pre-authorization data store 144 may maintain a short-term digital token, hash value, cryptogram, or other appropriate element of tokenized data representative of, and indicative of, the prior pre-authorization of each of the one or more expected purchase transactions (e.g., and generated by issuer system 140 and/or tokenization system 160 using any of the exemplary processes described herein). In some examples, token verification module 424 may perform operations that determine whether pre-authorization token 426 corresponds to one of the digital tokens, hash values, cryptograms, or other appropriate elements of tokenized data maintained within pre-authorization data store 144 and as such, that verify whether pre-authorization token 426 is representative of a corresponding one of the expected purchase transactions previously authorized by issuer system 140.

If, for example, token verification module 424 were to establish that pre-authorization token 426 fails to correspond to any of the elements of tokenized data maintained within pre-authorization data store 144, token verification module 424 may determine that pre-authorization token 426 does not correspond to an expected purchase transaction pre-authorized by issuer system 140. As such, token verification module 424 may also determine that pre-authorization token 426 is invalid for the purchase transaction initiated by client device 102 at terminal device 122 (e.g., the $7.25 purchase of oatmeal and coffee from the Starbucks™ coffee shop located in Washington, D.C., at 2130 H Street NW), and issuer system 140 may decline to authorize the purchase transaction based on pre-authorization token 426.

Issuer system 140 may generate and transmit a message indicative of the invalidity of pre-authorization token 426, and the declined authorization, across network 120 to payment network system 150 (not illustrated in FIG. 4A), which may route the error message to terminal device 122 using any of the processes described herein. In some instances, terminal device 122 may perform operations (not illustrated in FIG. 4A) that generate and present interface elements indicative of the declined authorization through a corresponding display unit, e.g., display unit 127A. Additionally, or alternatively, terminal device 122 may also perform operations that route all of a portion of the received message to client device 102, e.g., across direct communications channel 120A.

Alternatively, if token verification module were to establish that pre-authorization token 426 corresponds to one of the elements of tokenized data maintained within pre-authorization data store 144, token verification module 424 may determine that pre-authorization token 426 represents an expected purchase transaction pre-authorized by issuer system 140 using any of the exemplary processes described herein. Based on this determination, token verification module 424 may perform operations that route pre-authorization token 426 to a token redemption module 428, which may perform operations that package pre-authorization token 426 into a request 430 for data characterizing the pre-authorized purchase transaction represented by pre-authorization token 426, e.g., as maintained in a secure data repository by tokenization system 160. For example, the requested data may include, but is not limited to, a value of a transaction parameter characterizing the pre-authorized purchase transaction (e.g., a pre-authorized transaction value), information identifying a payment instrument capable of funding the pre-authorized purchase transaction, and data characterizing a temporal or geographic restriction imposed on the pre-authorized purchase transaction.

Token redemption module 428 may provide request 430, which includes pre-authorization token 426, as an input to a routing module 432 of issuer system 140. In some instances, routing module 432 may access TSP data 146 (e.g., as maintained locally within one or more tangible, non-transitory memories), and may access and load network address 252 of tokenization system 160, such as an IP address or a MAC address. Routing module 432 may perform operations that cause issuer system 140 to transmit request 430 across network 120 to the network address of tokenization system 160, e.g., using any of the communications protocols described herein.

Figure 4B:
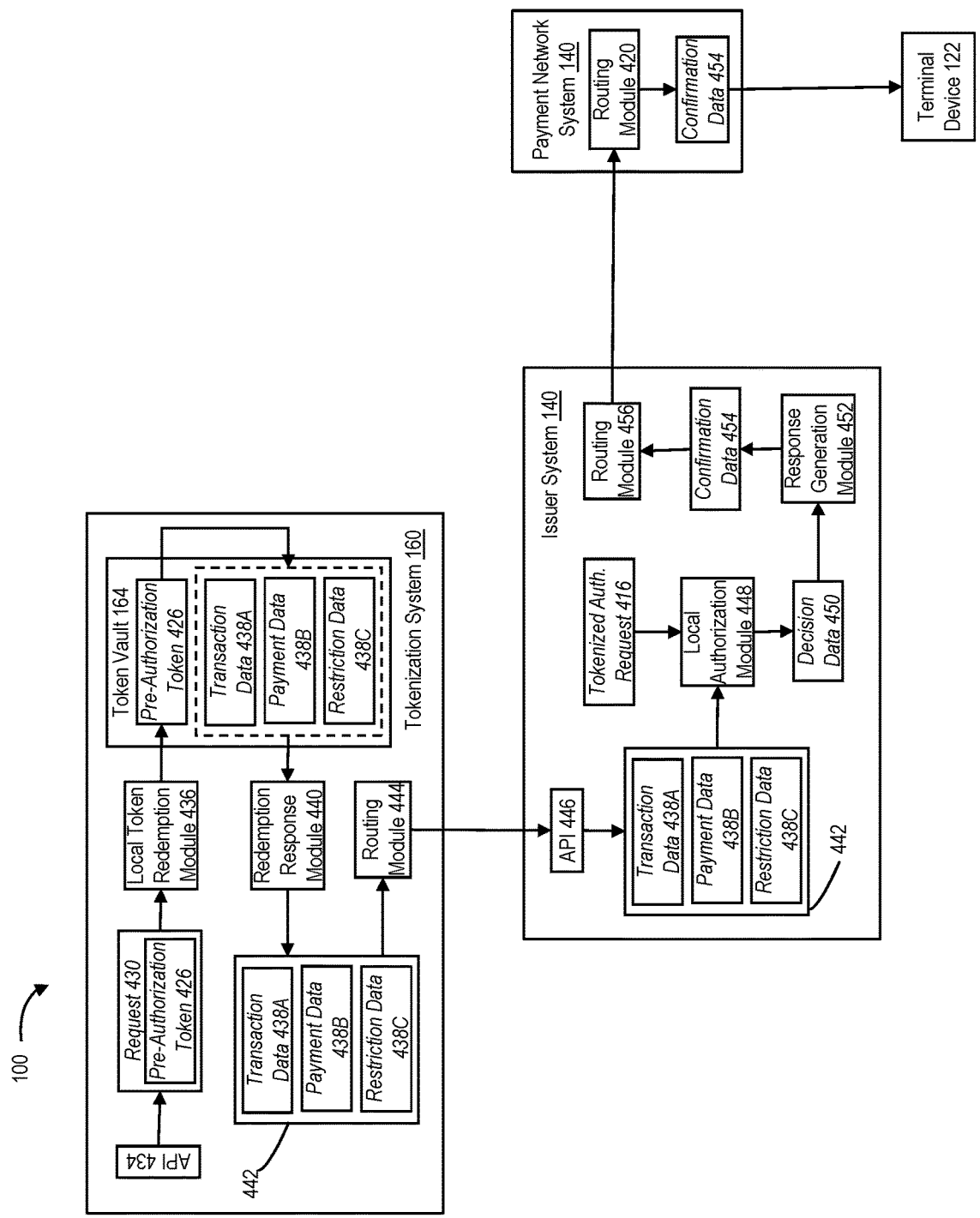

Referring to FIG. 4B, a programmatic interface established and maintained by tokenization system 160, e.g., application programming interface (API) 434 may receive request 430 from issuer system 140. By way of example, API 434 may be associated with, and established and maintained by a local token redemption module 436 of tokenization system 160, and may facilitate direct, module-to-module communications between routing module 432 of issuer system 140 and local token redemption module 436. API 434 may provide request 430 as an input to local token redemption module 436, which may perform operations that parse request 430 to extract pre-authorization token 426, that that identify and load, from a secure data repository (e.g., token vault 164), information characterizing the pre-authorized purchase transaction represented by pre-authorization token 426.

For example, local token redemption module 436 may access token vault 164 (e.g., as maintained within a tangible, non-transitory memory by tokenization system 160), and access and load pre-authorized transaction data 438A, pre-authorized payment data 438B, and restriction data 438C, each of which may be associated with pre-authorization token 426 and characterize the pre-authorized purchase transaction involving merchant 121 (e.g., the Starbucks™ coffee shop located in Washington, D.C., at 2130 H Street N.W.). In some instances, pre-authorized transaction data 438A may specify a value of one or more transaction parameters that characterize the pre-authorized transaction, such as, but not limited to, a pre-authorized transaction amount (e.g., $20.00) or an identifier of one or more products or services subject to the pre-authorized purchase transaction, such as UPCs assigned to coffee, oatmeal, etc. (e.g., as identified in parameter data 227B of FIG. 2B). Further, pre-authorized payment data 438B may include, but is not limited to, information characterizing a payment instrument held by user 101 and capable of funding the pre-authorized purchase transaction, e.g., an actual account number, expiration date, verification code, or cardholder information characterizing the Visa™ credit card held by user 101 (e.g., as identified in payment data 227C of FIG. 2B).

Restriction data 438C may include information that specifies one or more temporal and/or geographic restrictions imposed on the pre-authorized purchase transaction. For example, restriction data 438C may include temporal information that identifies a time, e.g., a tokenization time, at which tokenization system 160 generated pre-authorization token 426. Further, restriction data 438C may also include additional temporal information (e.g., all or a portion of temporal data 227D of FIG. 2B) that specifies a temporal interval, subsequent to the tokenization time, during which client device 102 is expected to initiate pre-authorized purchase transaction with merchant 121 (e.g., via terminal device 122).

In some instances, the temporal interval may include a predetermined or fixed time period established by issuer system 140 or tokenization system 160 (e.g., five minutes, ten minutes, thirty minutes, etc.). Additionally, or alternatively, the temporal interval may also include an adaptively determined time period (e.g., as determined by contextual transaction system 130, issuer system 140, and/or tokenization system 160) that accounts for, among other things, a displacement between client device 102 and terminal device 122 (and/or other discrete geographic position associated with merchant 121) within a corresponding geographic region, and monitored traffic, transit, or weather conditions within that geographic region.

Further, restriction data 438C may also include geographic information that identifies one or more discrete geographic positions associated with merchant 121 (e.g., all or a portion of geographic data 227E of FIG. 2B). As described herein, examples of these discrete geographic positions include, but are not limited to, a street address or a set of geospatial coordinates associated with merchant 121 (e.g., the Starbucks™ coffee shop located in Washington, D.C., at 2130 H Street N.W.), a virtual boundary or geofence associated with merchant 121, or set of geospatial coordinates associated with a terminal device operated by merchant 121, such as terminal device 122. In other instances, the geographic information may also include one or more identifiers associated with merchant 121 (e.g., all or a portion of merchant identifier data 227A of FIG. 2B), and examples of these merchant identifiers include, but are not limited to, a merchant name (e.g., Starbucks™), an MCC code assigned to merchant 121, or unique network address assigned to a terminal device operated by merchant 121, such as an IP address or a MAC address of terminal device 122.

In some examples, as described herein, the temporal information maintained within restriction data 438C may establish a limited period of temporal validity for the pre-authorization of the purchase transaction involving merchant 121 and user 101, and as such, may impose a corresponding and limited period of temporal validity on pre-authorization token 426, which represents the pre-authorization of the purchase transaction. Similarly, the geographic information maintained within restriction data 438C may limit a geographic validity of the pre-authorized purchase transaction, and as such, may impose a corresponding limitation on the geographic validity on pre-authorization token 426. The disclosed embodiments are, however, are not limited to these examples of temporal or geographic information, and in other instances, restriction data 438C may include any additional or alternate data characterizing imposing a temporal geographic, or other restriction on a capability of issuer system 140 to authorize an initiated purchase transaction using pre-authorization token 426.

Referring back to FIG. 4A, local token redemption module 436 may provide pre-authorized transaction data 438A, pre-authorized payment data 438B, and restriction data 438C as inputs to a redemption response module 440 of tokenization system 160. In some examples, redemption response module 440 may perform operations that package portions of pre-authorization transaction data 438A, pre-authorization payment data 438B, and restriction data 438C into a corresponding redemption response 442, which redemption response module 440 may provide as input to a routing module 444 of tokenization system 160. Routing module 444 may perform operations that cause tokenization system 160 to transmit redemption response 442 across network 120 to a network address of issuer system 140, e.g., using any of the communications protocols described herein. In some examples, described below in reference to FIG. 4B, issuer system 140 may perform any of the exemplary processes described herein to authorize the purchase transaction initiated by client device 102 at terminal device 122 based portions of redemption response 442, which identifies and characterizes the pre-authorized purchase transaction represented by pre-authorization token 426.

A programmatic interface of issuer system 140, e.g., an authorization API 446 maintained by a local authorization module 448 of the issuer system 140, may receive redemption response 442 and relay redemption response 442 to local authorization module 448. In some instances, authorization API 446 may facilitate secure, module-to-module communication between routing module 444 and local authorization module 448 across network 120. Local authorization module 448 may receive redemption response 442, and store redemption response 442 within one or more tangible, non-transitory memories. Local authorization module 448 may also parse redemption response 442 to extract, among other things, pre-authorized transaction data 438A (e.g., specifying one or more parameter values of the pre-authorized purchase transaction), pre-authorized payment data 438B (e.g., specifying account information of the payment instrument capable of funding the pre-authorized purchase transaction), and restriction data 438C (e.g., imposing temporal and/or geographic restrictions on the pre-authorization of the purchase transaction).

Local authorization module 448 may also load, from the one or more tangible, non-transitory memories, portions of tokenized authorization request 416 that characterize the purchase transaction initiated by client device 102 (e.g., the $7.25 purchase of coffee and oatmeal from the Starbucks™ coffee shop located at 2130 H Street N.W., initiated at 8:45 a.m. on Mar. 1, 2018). In some examples, as described herein, local authorization module 448 may perform operations that authorize the initiated purchase transaction based on not only a determined consistency between the parameter values that characterize the initiated purchase transaction and corresponding ones of the pre-authorized transaction values, but also on a determination that the initiated purchase transaction comports with the temporal and/or geographic restrictions imposed on the pre-authorized purchase transaction and as such, on pre-authorization token 426.

In some instances, local authorization module 448 may perform operations that extract, from tokenized authorization request 416, values of one or more transaction parameters that characterize the initiated purchase transaction, such as, but not limited to, an initiated transaction value of $7.25, and one or more identifiers of products involved in the initiated purchase transaction (e.g., UPCs assigned to the purchase coffee or oatmeal). Additionally, local authorization module 448 may perform further operations that extract, from tokenized authorization request 416, a transaction time or date (e.g., 8:45 a.m. on Mar. 1, 2018), and data identifying the parties to the initiated purchase transaction (e.g., a unique identifier of client device 102 and/or terminal device 122 (such as IP addresses or MAC addresses), a discrete geographic position associated with merchant 121 or terminal device 122 (such as a street address or geospatial coordinates), etc.).

Local authorization module 448 may determine whether parameter values that characterize the initiated purchase transaction (e.g., initiated transaction value of $7.25 or the product identifies of the purchased coffee or oatmeal) are consistent with corresponding ones of the pre-authorized parameter values (e.g., as specified within pre-authorized parameter data 438A). By way of example, pre-authorized parameter data 438A may specify a pre-authorized transaction value of $20.00 (e.g., that issuer system 140 performed any of the exemplary processes described herein to pre-authorize a $20.00 purchase of products or services from merchant 121 using the Visa™ credit card held by user 101) and may specify one or more product identifies, such as the UPCs assigned to coffee and oatmeal, involved in the pre-authorized $20.00 purchase.

In one instance, if local authorization module 448 were to establish an inconsistency between the values of one or more of the initiated transaction parameters and corresponding ones of the pre-authorized transaction parameter values, local authorization module 448 may decline to authorize the initiated purchase transaction. For example, local authorization module 448 may establish that the initiated transaction value exceeds the pre-authorized transaction values, or that one or more of the identified of the products involved in the initiated purchase transaction are inconsistent with, or absent from, the pre-authorized product identifies. Based on the established inconsistency, local authorization module 448 may perform operations that generate message data indicative of the declined purchase transaction (e.g., in accordance with one or more appropriate payment or authorization protocols, such as the EMV payment protocol described herein), and issuer system 149 may perform operations that transmit the generated message data to terminal device 122 via payment network system 150, e.g., using any appropriate communications protocols (not depicted in FIG. 4B).

In other instances, local authorization module 448 may establish that each of the values of one or more of the initiated transaction parameters are indeed consistent with the corresponding ones of the pre-authorized transaction parameter values. For example, as the parameter values that characterize the initiated purchase transaction include the initiated transaction value of $7.25, local authorization module 448 may determine that the initiated transaction value is equivalent to or less than, and thus consistent with, the pre-authorized transaction value of $20.00. In response to the established consistency, local authorization module 448 may perform additional operations that determine whether the initiated purchase transaction (e.g., the $7.25 purchase of coffee and oatmeal from the Starbucks™ coffee shop at 2130 H Street N.W. at 8:45 a.m. on Mar. 1, 2018) comports with the temporal and/or geographic limitations imposed on the pre-authorized purchase transaction, and as such, on pre-authorization token 426.

For example, the temporal limitation may specify that the pre-authorization of the purchase transaction, and thus, pre-authorization token 426, is valid for a predetermined or adaptively determined temporal interval (e.g., ten minutes) subsequent to the generation of pre-authorization token 426 (e.g., at 8:41 a.m. on Mar. 1, 2018). In other examples, the geographic limitation may include a position-specific limitation, such as, but not limited to, an imposed requirement that a geographic position of merchant 121 or terminal device 122 involved in the initiated purchase transaction (e.g., as specified within tokenized authorization request 416, or as maintained within merchant data 143) be disposed within a predetermined or adaptively determined distance of a discrete geographic position specified in restriction data 438C. Additionally, or alternatively, the geographic limitations may also include a merchant-specific limitation, such as, but not limited to, an imposed requirement that client device 102 initiate the purchase transaction at a particular merchant or at a particular terminal device (e.g., as specified by a merchant identifier or a terminal-device network address specified within restriction data 438C).

In one instance, and based on portions of tokenized authorization request 416, local authorization module 448 may determine that the initiated purchase transaction (e.g., the $7.25 purchase of coffee and oatmeal from the Starbucks™ coffee shop at 2130 H Street N.W. at 8:45 a.m. on Mar. 1, 2018) is inconsistent with the imposed temporal limitation, or with the imposed position-specific or merchant-specific geographic location. For example, and based on the transaction time or date of the initiated purchase transaction, local authorization module 448 may establish that client device 102 initiated the purchase transaction outside of the predetermined or adaptively determined temporal interval subsequent to the generation of pre-authorization token 426 (e.g., greater than ten minutes after the generation of pre-authorization token 426), and as such, that the initiated purchase transaction is inconsistent with the imposed temporal limitation.

In other examples, local authorization module 448 may determine that a distance between a geographic position associated with terminal device 122 (e.g., as specified within tokenized authorization request 416 or within merchant data 143) and a discrete geographic position specified within restriction data 438C exceeds a predetermined or adaptively determined distance, and thus, that the initiated purchase transaction is inconsistent with the imposed position-specific geographic limitation. Additionally, or alternatively, local authorization module 448 may establish that client device 102 initiated the purchase transaction at a merchant (e.g., based on a merchant identifier maintained within tokenized authorization request 416) or a terminal device (e.g., based on a device identifier maintained within tokenized authorization request 416) that is inconsistent with the identifier of the merchant or terminal device specified in restriction data 438C. As such, local authorization module 448 may determine that the initiated purchase transaction is inconsistent with the imposed merchant-specific geographic limitation. Further, in some instances, local authentication module 448 may also establish that the initiated purchase transaction comports with the imposed position-specific geographic limitation, but nonetheless is inconsistent with the imposed merchant-specific geographic limitation (e.g., that client device 102 initiated the purchase transaction at a geographic position that is consistent with the limitations imposed on pre-authorization token 426, but at a merchant different from merchant 121 for which issuer system 140 pre-authorized the purchase transaction).

Based on a determination that the initiated purchase transaction is inconsistent with the imposed temporal limitation, or one or more of the imposed position-specific or merchant-specific geographic limitations, local authorization module 448 may decline to authorize the initiated purchase transaction. As described herein, local authorization module 448 may perform operations that generate and transmit message data indicative of the declined purchase transaction (e.g., in accordance with one or more appropriate payment or authorization protocols, such as the EMV payment protocol described herein). Issuer system 140 may perform operations that transmit the generated message data to terminal device 122 via payment network system 150, e.g., using any of the communications protocols described herein (not depicted in FIG. 4B).

In other examples, and based on a determination that the values of one or more of the initiated transaction parameters are consistent with the corresponding ones of the pre-authorized transaction parameter values, and on a further determination that the initiated purchase transaction is consistent with the imposed temporal limitations and each of the imposed position- or merchant-specific geographic limitations, local authorization module 448 may elect authorize the initiated purchase transaction based on the extracted transaction parameter values and using the account information characterizing the Visa™ credit card held by user 101 (e.g., as specified within pre-authorized payment data 438B). Further, in some instances, local authorization module 448 may perform operations that authorize the initiated purchase transaction in accordance with one or more appropriate payment or authorization protocols, such as the EMV payment protocol described herein.

For instance, and referring back to FIG. 4B, local authorization module 448 may generate decision data 450 indicative of the decision to authorize the initiated purchase transaction using the Visa™ credit card held by user 101. For example, an in response to a decision to authorize the initiated purchase transaction using the Visa™ credit card, local authorization module 448 may generate an authorization code, and package the generated authorization code and data that characterizes the authorized purchase transaction (such as the authorized transaction amount, the parties to the authorized transaction, etc.) into decision data 450. In some aspects, local authorization module 448 may provide decision data 450 as an input to a response generation module 452.

Response generation module 452 may perform operations that package all or a portion of decision data 450 into a confirmation message 454 indicative of the authorized status of the initiated purchase transaction. Response generation module 452 may further provide confirmation message 454 an as input to a routing module 456, which perform operations that transmits confirmation message 454 across network 120 to payment network system 150.

Routing module 420 of payment network system 150 may receive confirmation message 454 from issuer system 140 (e.g., through a corresponding programmatic interface or API), and may transmit confirmation message 454 across network 120 to terminal device 122, e.g., directly or through one or more intermediate systems, such as the computing system associated with the acquirer, using any of the communications protocols described herein. In some examples, not illustrated in FIG. 4B, payment network system 150 may, in conjunction with issuer system 140 and the acquirer system, perform operations that settle and clear the now-authorized purchase transaction (e.g., by debiting and crediting accounts maintained on behalf of corresponding ones of issuer system 140 (and thus, user 101) and the acquirer system (and thus, merchant 121) in accordance with the one or more payment or authorization protocols, such as the EMV payment protocol described herein.

Terminal device 122 may receive confirmation message 454 through a corresponding communications unit, such as communications unit 127C of FIG. 1, and terminal device 122 may perform operations that extract decision data 450 from confirmation message 454 (not depicted in FIG. 4B). As described herein, decision data 450 may include the authorization code and the additional data that characterizes the authorized transaction (e.g., the authorized transaction amount, the parties to the authorized transaction, etc.), which terminal device 122 stores within one or more data records of transaction log 126B, along with additional values of transaction parameters, such as, but not limited to, a transaction time and date or a transaction location.

In some examples, not illustrated in FIG. 4B, terminal device 122 may perform additional operations that validate and authenticity and an integrity of confirmation message 454 in accordance with the one or more payment or authorization protocols, such as the EMV payment protocol described herein. Further, although not depicted in FIG. 4B, terminal device 122 may perform operations that generate and display interface elements representative of decision data 450 on a corresponding graphic user interface (GUI). In some examples (not illustrated in FIG. 4B), terminal device 122 may also transmit all, or a portion, of decision data 450 to client device 102 across direct communications channel 120A, e.g., using any of the short-range communications protocols described herein.

Figure 5:
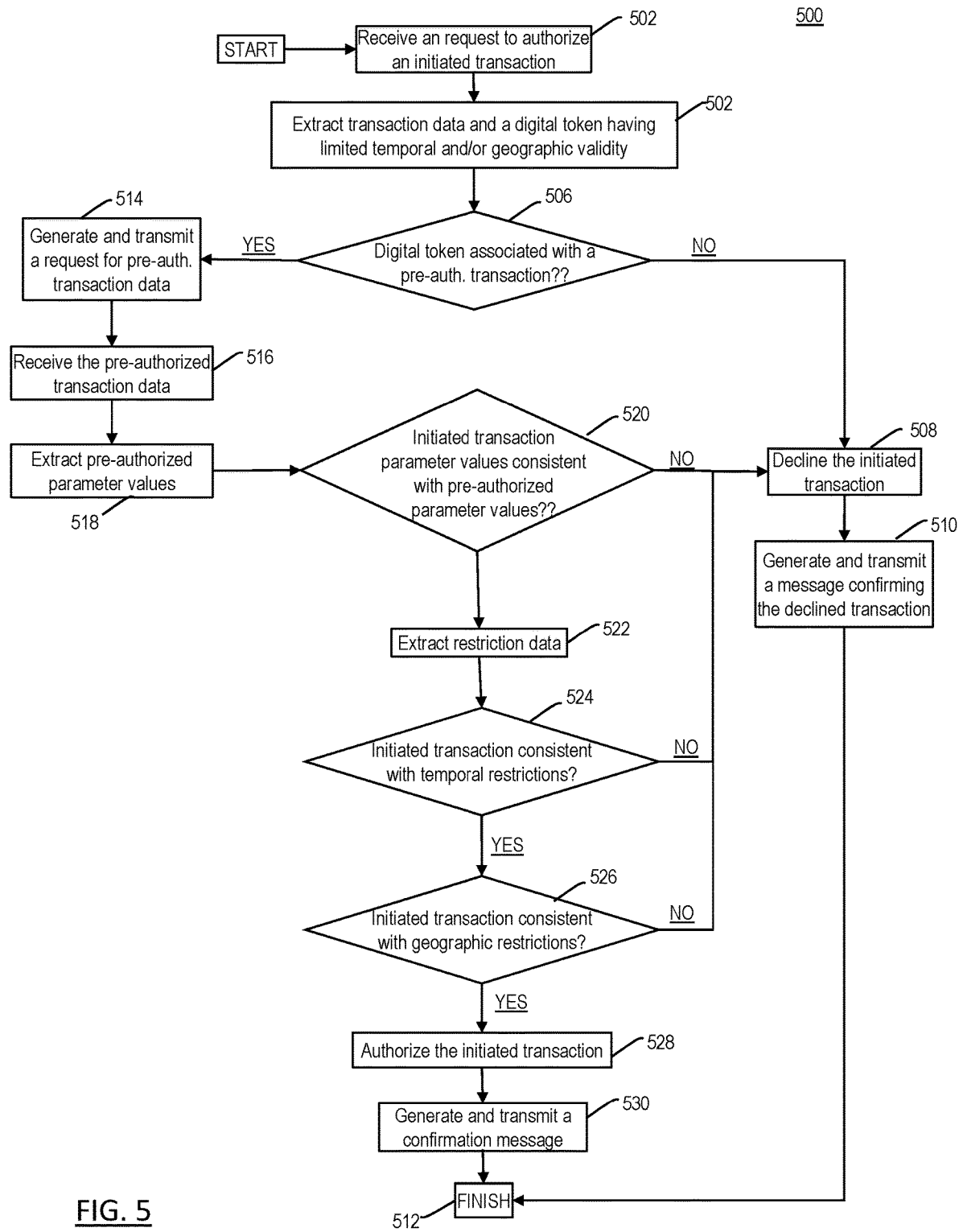
FIG. 5 is a flowchart of an exemplary process for authorizing initiated exchanges of data in real-time using tokenized data having limited temporal or geographic validity, consistent with the disclosed embodiments.

FIG. 5 is a flowchart of an exemplary process 500 for authorizing initiated exchanges of data in real-time using tokenized data having limited temporal or geographic validity, in accordance with disclosed embodiments. In some examples, issuer system 140 may perform the steps of exemplary process 500, which include, among other things, receiving a request to authorize a purchase transaction initiated at a network-connected terminal device, such as terminal device 122 of FIG. 1, by a network-connected client device, such as client device 102 of FIG. 1. As described herein, the received authorization request may include tokenized data, such as a pre-authorization token, having a limited temporal and geographic validity, and the steps of exemplary process 500 may also include, among other things, authorizing the initiated purchase transaction based on an established a consistency between values of transaction parameters that characterize the initiated and pre-authorized purchase transactions, and on a determination that the initiated purchase transaction comports with the temporal or geographic limitations imposed on the pre-authorization token.

Referring to FIG. 5, issuer system 140 may receive a request to authorize an exchange of data initiated by client device 102 at terminal device 122 (e.g., in step 502). As described herein, the initiated data exchange may facilitate an initiation of a transaction (e.g., a purchase transaction) to purchase a product or service offered for sale by a merchant that operates terminal device 122, e.g., merchant 121 of FIG. 1, and issuer system 140 may receive the authorization request from a computing system maintained by a payment network, e.g., payment network system 150 of FIG. 1.

In some examples, issuer system 140 may perform operations that extract, from the receive authorization request, transaction data characterizing the initiated purchase transaction and further, tokenized payment data that identifies, or is associated with, a payment instrument available to fund the initiated purchase transaction (e.g., in step 504). As described herein, the transaction data may include, but is not limited to, a corresponding transaction value, corresponding transaction time or date, or a corresponding identifier assigned to the product or service involved in the transaction (e.g., an assigned universal product code (UPC), etc.).

Further, the tokenized payment data may include a digital token, e.g., a pre-authorization token, characterized by a limited geographic validity and additionally, or alternatively, a limited period of temporal validity. The pre-authorization token may, in some instances, be indicative of a pre-authorization of an expected occurrence of a purchase transaction initiated by client device 102, e.g., by issuer system 140 using any of the exemplary processes described herein.

Referring back to FIG. 5, issuer system 140 may perform any of the exemplary processes described herein to determine whether the received pre-authorization token is associated with a purchase transaction previously pre-authorized by issuer system 140 (e.g., in step 506). For example, if issuer system 140 were to determine that the received pre-authorization token is unassociated with any of the purchase transactions previously pre-authorized by issuer system 140 (e.g., step 506; NO), issuer system 140 may determine that the received pre-authorization token is not associated with any of the pre-authorized purchase transactions, and is therefore invalid.

Issuer system 140 may decline to authorize the initiated purchase transaction (e.g., in step 508), and may perform additional operations that generate and transmit a confirmation message indicative of the declined authorization across network 120 to payment network system 150 (e.g., in step 510). As described herein, payment network system 150 may perform operations that route the confirmation message across network 120 to terminal device 122, either directly or through one or more intermediate computing systems, such as a computing system maintained by an acquirer of terminal device 122. Exemplary process 500 is then complete in step 512.

Alternatively, if issuer system 140 were to determine that the extract pre-authorization token is associated with a corresponding one of the purchase transactions previously pre-authorized by issuer system 140 (e.g., step 506; YES), issuer system issuer system 140 may perform that package the received pre-authorization token into a request for data characterizing the associated pre-authorized purchase transaction (e.g., in step 514). Issuer system 140 may further transmit the generated request across network 120 to a network-connected computing system that generated the received pre-authorization token, such as tokenization system 160 (e.g., also in step 514).

Tokenization system 160 may receive the generated request, e.g., through one or more programmatic interfaces, and may perform operations that extract the corresponding pre-authorization token from the request. In some examples, and as described herein, tokenization system 160 may access a secure data repository (e.g., token vault 164 of FIG. 1), and may perform any of the exemplary processes described herein to identify and load, from the secure data repository, information characterizing the pre-authorized purchase transaction associated with the corresponding pre-authorization token. Tokenization system 160 may package all or a portion of the loaded information into a response to the received request, which tokenization system 160 may transmit across network 120 to issuer system 140, e.g., using any of the communications protocols described herein.

Issuer system 140 may receive the data characterizing the associated pre-authorized purchase transaction from tokenization system 160 (e.g., in step 516). In some instances, the received information may include pre-authorized transaction data that specifies a value of one or more transaction parameters that characterize the pre-authorized purchase transaction, such as, but not limited to, a pre-authorized transaction value or an identifier assigned to one or more products or services involved in the pre-authorized purchase transaction (e.g., an assigned UPC, etc.). The received information may also include pre-authorized payment data that characterizes a payment instrument held by user 101 and capable of funding the pre-authorized purchase transaction, e.g., an actual account number, expiration date, verification code, or cardholder information characterizing the payment instrument.

The received information may also include restriction data that specifies and characterizes the one or more temporal and/or geographic restrictions imposed on the pre-authorized purchase transaction, and thus, the received pre-authorization token. For example, the restriction data may include temporal information that identifies a time, e.g., a tokenization time, at which the tokenization system generated the received pre-authorization token, along with additional temporal information that specifies a temporal interval, subsequent to the tokenization time, during which client device 102 is expected to initiate pre-authorized purchase transaction with merchant 121 (e.g., via terminal device 122).

The restriction data may also include geographic information that identifies one or more discrete geographic positions associated with merchant 121, examples of which include, but are not limited to, a street address or geospatial coordinates associated with merchant 121, a virtual boundary or geofence associated with merchant 121, or geospatial coordinates associated with a terminal device operated by merchant 121, such as terminal device 122. In other instances, the geographic information may also include one or more identifiers associated with merchant 121, such as a merchant name, an MCC code assigned to merchant 121, or unique network address assigned to a terminal device operated by merchant 121, such as an IP address or a MAC address of terminal device 122.

In some examples, as described herein, the temporal information maintained within restriction data 438C may establish a limited period of temporal validity for the pre-authorization of the purchase transaction involving merchant 121, and as such, may impose a corresponding and limited period of temporal validity on the received pre-authorization token, which represents the pre-authorization of the purchase transaction. In other examples, the geographic information maintained within the restriction data may limit a geographic validity of the pre-authorized purchase transaction, and as such, may impose a corresponding limitation on the geographic validity on the received pre-authorization token.

Referring back to FIG. 5, issuer system 140 may perform operations that extract the pre-authorized parameter values that characterize the pre-authorized purchase transaction from the received data (e.g., in step 518). Based on the extracted pre-authorized parameter data, issuer system 140 may perform any of the exemplary processes described herein to determine whether the parameter values that characterize the initiated purchase transaction (e.g., the initiated transaction value, the identifiers of the product or service involved in the initiated purchase transaction, etc.) are consistent with corresponding ones of the pre-authorized parameter values (e.g., in step 520).

If issuer system 140 were to establish an inconsistency between the values of one or more of the initiated transaction parameters and corresponding ones of the pre-authorized parameter values (e.g., step 520; NO), issuer system 140 may decline to authorize the initiated purchase transaction (e.g., in step 508). Alternatively, if issuer system 140 were to determine that the value of each initiated transaction parameters is consistent with a corresponding one of the pre-authorized parameter values (e.g., step 518; YES), issuer system 140 may extract the restriction data from the received information (e.g., in step 522). Based on portions of the extracted restriction data and on portions of the parameter values that characterize the initiated purchase transaction, issuer system 140 may perform any of the exemplary described herein to determine here to determine whether the initiated purchase transaction is consistent with the one or more imposed temporal restrictions (e.g., in step 524).

If issuer system 140 were to determine that the initiated purchase transaction is inconsistent with at least one of imposed temporal restrictions (e.g., in step 524; NO), and issuer system 140 may decline to authorize the initiated purchase transaction (e.g., in step 508). Alternatively, if issuer system 140 were to determine that the initiated purchase transaction is consistent with each of the imposed temporal restrictions (e.g., in step 524; YES), and issuer system 140 may perform any of the exemplary processes described herein determine whether the initiated purchase transaction is consistent with each of the one or more imposed geographic restrictions, such as the position- or merchant-specific restrictions described herein (e.g., in step 526).

By way of example, if issuer system 140 were to determine that the initiated purchase transaction is inconsistent with at least one of imposed geographic restrictions, including, but not limited to, the position- or merchant-specific restrictions described herein (e.g., in step 526; NO), and issuer system 140 may decline to authorize the initiated purchase transaction (e.g., in step 508). In other examples, if issuer system 140 were to determine that the initiated purchase transaction is also consistent with each of the imposed geographic restrictions (e.g., step 526; YES); issuer system 140 may perform operations that authorize the initiated purchase transaction based on the extracted transaction parameter values and using the account information included within the pre-authorized payment data (e.g., in step 528). For example, issuer system 140 may authorize the initiated purchase transaction (e.g., in step 528) in accordance with one or more appropriate payment or authorization protocols, such as the EMV payment protocol described herein.

Issuer system 140 may perform any of the exemplary processes described herein to generate a confirmation message indicative of the now-authorized purchase transaction, and transmit the generated confirmation message across network 120 to payment network system 150 (e.g., in step 530). In some examples, and as described herein, the confirmation message may include an authentication code (e.g., as generated by issuer system 140 in accordance with one or more payment or authorization protocols, such as the EMV payment protocol), and payment network system 150 may route the confirmation message to terminal device 122 through one or more intermediate computing systems, such as a computing system associated with an acquirer of terminal device 122. Exemplary process 500 is then complete in step 512.

In some examples, the authorization of the initiated purchase transaction (and additionally, or alternatively, other exchanges of data initiated by client device 102 at terminal device 122) based on a pre-authorization token (or other tokenized data) characterized by a limited period of temporal validity and a limited geographic validity may increase a security of the overall transaction initiation and authorization process. Further, these exemplary authorization processes may also reduce an ability of a malicious third party to initiate fraudulent transactions via network-connected mobile devices, as the third party would not only need to intercept the tokenized data characterized by the limited temporal and geographic validity, but would also need to initiate the fraudulent transaction while proximate to a currently location of client device 102 and during the future temporal interval (e.g., to comply with the geographic and temporal restrictions imposed on the intercepted tokenized data). Certain of these exemplary processes, which initiate and authorize initiated data exchanges and transactions based on tokenized data having limited temporal and geographic validity, may be implemented in addition to, or as an alternate to, other processes that initiate and authorize transactions based on tokenized payment data.

In other instances, certain of these exemplary authorization process may improve a speed or efficiency at which terminal devices operate and further, may facilitate a performance of these exemplary authorization processes by terminal devices having limited functionalities. For example, using the exemplary authorization processes described herein, a terminal device, such as terminal device 122, need not maintain locally a secured repository of tokenized data, e.g., the pre-authorization token described herein. Instead, terminal device 122 may initiate the authorization of an initiated data exchange, such as the purchase transaction described herein, by routing a received pre-authorization token to one or more computing systems maintained by an appropriate payment system, such as payment network system 150 (e.g., directly or via an acquirer system), along with data characterizing the initiated purchase transaction or information identifying terminal device 122.

An absence of a secured data repository to maintain tokenized data may, in some instances, reduce an imposed memory requirement on a terminal device, and may enable terminal devices having limited functionalities, such as wearable devices and wearable form factors having limited processor functionality or memory capacity, to perform certain of the exemplary authorization processes described herein. Further, by routing the received pre-authorization token to payment network system 150, certain of the exemplary processes described herein may improve a speed and efficiency at which a terminal device requests an authorization of an initiated purchase transaction (e.g., without accessing and comparing locally maintained tokenized data against a received pre-authorization token). Certain of these exemplary authorization processes, which enable a terminal device to request an authorization of initiated data exchanges and transactions based on tokenized data transmitted to a payment network, may be implemented in addition to, or as an alternate to, other processes that initiate and authorize transactions based on tokenized payment data maintained locally by the terminal device.

IV. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including payment application 107, management module 202, triggering module 212, authentication module 214, proximity detection module 218, pre-authorization request module 224, routing module 234, API 236, local management module 238, pre-authorization module 240, token request module 246, routing module 250, API 254, management module 256, token generation module 258, linking module 262, routing module 264, provisioning module 268, routing module 272, API 274, local provisioning module 276, payment initiation module 402, transaction initiation module 408, authorization request module 412, routing module 418, routing module 420, token verification module 424, token redemption module 428, API 434, local token redemption module 436, redemption response module 440, routing module 444, API 446, local authorization module 448, response generation module 452, and routing module 456, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications unit;
   a memory storing instructions; and
   at least one processor coupled to the communications unit and the memory, the at least one processor being configured to execute the instructions to:
      obtain a first geographic position of a client device;
      generate pre-authorization data associated with a transaction involving the client device and a terminal device, the terminal device being disposed within a geographic region that includes the first geographic position; and
      transmit the pre-authorization data to a computing system via the communications interface, the pre-authorization data instructing the computing system to perform operations that provide, to the client device, a digital token representative of a pre-authorization of the transaction during a temporal interval.

2. The apparatus of claim 1, wherein the transaction involving the client device and the terminal device occurs during the temporal interval, and the pre-authorization data comprises the temporal interval.

3. The apparatus of claim 1, wherein the at least one processor is further configured to execute the instructions to receive positional data from the client device via the communications unit, the positional data comprising the first geographic position.

4. The apparatus of claim 3, wherein:
   the at least one processor is further configured to execute the instructions to receive, via the communications unit, the positional data from the client device across a first communications channel; and
   the client device is further configured to initiate the transaction and provide the digital token to the terminal device across a second communications channel.

5. The apparatus of claim 1, wherein:
   the pre-authorization data comprises a value of a parameter that characterizes the transaction, payment data that identifies a payment instrument available for use in the transaction, and the temporal interval;
   the pre-authorization data requests the pre-authorization of the transaction during the temporal interval in accordance with the parameter value and using the available payment instrument; and
   the pre-authorization data further instructs the computing system to perform operations that pre-authorize the transaction in accordance with the parameter value and using the available payment instrument.

6. The apparatus of claim 5, wherein the at least one processor is further configured to execute the instructions to obtain at least one of the parameter value or the payment data from the memory.

7. The apparatus of claim 5, wherein the digital token is further representative of the pre-authorization of the transaction in accordance with the parameter value and using the available data type available.

8. The apparatus of claim 1, wherein the at least one processor is further configured to execute the instructions to:
   obtain, from the memory, positional data that includes a second geographic position associated with the terminal device;
   determine that the first geographic position is disposed within a threshold distance of the second geographic position; and
   generate the pre-authorization data based on a determination that the first geographic position is disposed within the threshold distance of the second geographic position.

9. The apparatus of claim 1, wherein the at least one processor is further configured to execute the instructions to:
   obtain, from the memory, positional data that includes a plurality of second geographic positions, the second geographic positions being associated with the terminal device and establishing a virtual boundary;
   determine that the first geographic position is disposed within the virtual boundary established by the second geographic positions; and
   generate the pre-authorization data based on a determination that the first geographic position is disposed within the virtual boundary.

10. The apparatus of claim 1, wherein the at least one processor is further configured to execute the instructions to:
    receive provisioning data from the computing system via the communications unit, the provisioning data comprising the digital token; and
    transmit, via the communications unit, at least a portion of the provisioning data to the client device.

11. A computer-implemented method, comprising:
    obtaining, using at least one processor, a first geographic position of a client device;
    generating, using the at least one processor, pre-authorization data associated with a transaction involving the client device and a terminal device during a temporal interval, the terminal device being disposed within a geographic region that includes the first geographic position; and transmitting, using the at least one processor, the pre-authorization data to a computing system via the communications interface, the pre-authorization data instructing the computing system to perform operations that provide, to the client device, a digital token representative of a pre-authorization of the transaction during the temporal interval.

12. The computer-implemented method of claim 11, wherein:
the pre-authorization data comprises a value of a parameter that characterizes the transaction, payment data that identifies a payment instrument available for use in the transaction, and the temporal interval;
the pre-authorization data requests the pre-authorization of the transaction during the temporal interval in accordance with the parameter value and using the available payment instrument; and
the computer-implemented method further comprises performing, using the at least one processor, operations that pre-authorize the transaction in accordance with the parameter value and using the available payment instrument.

13. An apparatus, comprising:
a communications unit;
a memory storing instructions; and
at least one processor coupled to the communications unit and the memory, the at least one processor being configured to execute the instructions to:
receive pre-authorization data from a first computing system via the communications unit, the pre-authorization data being associated with a transaction involving a client device and a terminal device, and the terminal device being disposed within a geographic region that includes a geographic position of the client device;
based on the pre-authorization data, perform operations that pre-authorize the transaction during a corresponding temporal interval, and that obtain a digital token representative of the pre-authorization of the transaction; and
transmit the digital token to the client device via the communications unit.

14. The apparatus of claim 13, wherein the client device is configured to initiate the transaction and provide the digital token to the terminal device across a corresponding communications channel.

15. The apparatus of claim 13, wherein the at least one processor is further configured to execute the instructions to:
request and receive, via the communications unit, provisioning data associated with the pre-authorized transaction from a second computing system, the provisioning data comprising the digital token; and
transmit a portion of the provisioning data to the client device via the communications unit.

16. The apparatus of claim 13, wherein:
the pre-authorization data comprises a value of a parameter that characterizes the transaction, payment data that identifies a payment instrument available for use in the transaction, and the temporal interval; and
the at least one processor is further configured to pre-authorize the transaction during the temporal interval, in accordance with the parameter value, and using the available payment instrument.

17. The apparatus of claim 16, wherein the at least one processor is further configured to execute the instructions to:
generate token data that requests a generation of the digital token, the token data comprising at least one of parameter value, the payment data, or the temporal interval;
transmit the token data to a second computing system via the communications unit, the token data instructing the second computing system to perform operations that generate or obtain the digital token; and
in response to the transmitted token data, receive the digital token from the second computing system via the communications unit.

18. The apparatus of claim 13, wherein the at least one processor is further configured to execute the instructions to:
receive an authorization request from the terminal device via the communication unit, the authorization request comprising transaction data associated with an initiated transaction involving the client device and the digital token, and the transaction data comprising first parameter values that characterize the initiated transaction;
based on the authorization request, obtain information associated with the digital token, the information comprising second parameter values that characterize the pre-authorized transaction and restriction data characterizing a temporal or geographic validity of the digital token;
determine that the first parameter values are consistent with corresponding ones of the second parameter values and with corresponding portions of the restriction data; and
in response to the determined consistency, perform operations that authorize an execution of the initiated transaction in accordance with the first parameter values.

19. The apparatus of claim 18, wherein:
the first parameter values include a transaction time or date;
the restriction data includes the temporal interval; and
the at least one processor is further configured to execute the instructions to establish the temporal validity of the digital token based on a determination that the temporal interval includes the transaction time or date.

20. The apparatus of claim 18, wherein:
the first parameter values include a first geographic position of the terminal device;
the restriction data includes a second geographic position associated with the pre-authorized transaction; and
the at least one processor is further configured to execute the instructions to establish the geographic validity of the digital token based on a determination that the first geographic position is disposed within a threshold distance of the second geographic position.

* * * * *